US010661282B2

(12) United States Patent
Wilson et al.

(10) Patent No.: US 10,661,282 B2
(45) Date of Patent: May 26, 2020

(54) AGGLOMERATED HEMICELLULOSE COMPOSITIONS, METHODS OF PREPARATION THEREOF, AND PROCESSES FOR ENRICHING A DESIRED MINERAL FROM AN ORE

(71) Applicant: KEMIRA OYJ, Helsinki (FI)

(72) Inventors: Duane C. Wilson, Marietta, GA (US); Xihui Yin, Marietta, GA (US); Stephanie Kofsky-Wofford, Marietta, GA (US); Anna I. Casasús, Alpharetta, GA (US)

(73) Assignee: KEMIRA OYJ, Helsinki (FI)

( * ) Notice: Subject to any disclaimer, the term of this patent is extended or adjusted under 35 U.S.C. 154(b) by 377 days.

(21) Appl. No.: 15/707,255

(22) Filed: Sep. 18, 2017

(65) Prior Publication Data

US 2018/0078951 A1    Mar. 22, 2018

Related U.S. Application Data

(60) Provisional application No. 62/396,351, filed on Sep. 19, 2016.

(51) Int. Cl.
*B03D 1/016* (2006.01)
*B03D 1/02* (2006.01)
*C08L 5/14* (2006.01)
*C08B 37/00* (2006.01)

(52) U.S. Cl.
CPC ............. *B03D 1/016* (2013.01); *B03D 1/02* (2013.01); *C08B 37/0057* (2013.01); *C08L 5/14* (2013.01); *B03D 2201/06* (2013.01); *B03D 2203/02* (2013.01)

(58) Field of Classification Search
CPC ...... B03D 1/02; B03D 1/016; B03D 2201/06; B03D 2203/02; C08L 5/14; C08B 37/0057
USPC .............................. 209/167; 252/61
See application file for complete search history.

(56) References Cited

U.S. PATENT DOCUMENTS

| 4,853,114 | A * | 8/1989 | Lewis | B03D 1/016 209/167 |
|---|---|---|---|---|
| 2007/0261998 | A1 | 11/2007 | Crane | |
| 2009/0062523 | A1 | 3/2009 | Malkki | |
| 2009/0301972 | A1 | 12/2009 | Hines et al. | |
| 2013/0217073 | A1 | 8/2013 | Chundawat et al. | |
| 2014/0061101 | A1 * | 3/2014 | Silva | B03D 1/018 209/166 |

(Continued)

OTHER PUBLICATIONS

International Search Report for PCT/US2017/052011, dated Dec. 1, 2017.

(Continued)

*Primary Examiner* — Thomas M Lithgow
(74) *Attorney, Agent, or Firm* — Eversheds Sutherland (US) LLP

(57) ABSTRACT

Methods for preparing agglomerated hemicellulose compositions are provided. Agglomerated hemicellulose compositions comprising agglomerates are also provided herein. Also disclosed are processes for enriching a desired mineral from an ore comprising the desired mineral, wherein the process comprises carrying out a flotation process in the presence of one or more collecting agents and a depressant composition comprising an agglomerated hemicellulose composition.

6 Claims, 13 Drawing Sheets

(56) References Cited

U.S. PATENT DOCUMENTS

2014/0163210 A1 6/2014 Retsina et al.
2015/0196926 A1 7/2015 Da Costa et al.

OTHER PUBLICATIONS

"Particle Size Conversion Table I Sigma-Aldrich", Mar. 31, 2016, https:llwww.sigmaaldrich.com/chemistry/stockroom-reagents/learning-center/technical- 1 library/particle-size-conversion.html, pp. 1-2.

* cited by examiner

AGGLOMERATED HEMICELLULOSE COMPOSITIONS, METHODS OF PREPARATION THEREOF, AND PROCESSES FOR ENRICHING A DESIRED MINERAL FROM AN ORE

CROSS-REFERENCE TO RELATED APPLICATION

This application claims priority to U.S. Provisional Application No. 62/396,351, filed Sep. 19, 2016, the entirety of which is incorporated herein by reference.

FIELD OF THE ART

The present disclosure generally relates to compositions that can be used as depressants in mineral ore flotation processes.

BACKGROUND

In the processing of mineral-containing ores, it is necessary to separate undesirable minerals known as gangue (e.g., $Al_2O_3$, $SiO_2$ and $TiO_2$) from the desired minerals in ore (e.g., iron ore). One method of accomplishing this goal is to depress the flotation of a particular mineral during the normal flotation process. In mineral flotation systems, it is common to depress the gangue materials while floating the desirable mineral or minerals. In differential or reverse flotation systems, it is common to depress the desired mineral or minerals while floating the gangue. Depression is conventionally accomplished by the use of one or more depressing agents (also known as depressants) during the flotation step. The depressant, when added to the flotation system, exerts a specific action on the material to be depressed thereby preventing it from floating. The ability of the depressant to facilitate such separation is referred to as its selectivity, i.e., a more selective depressant achieves better separation of the gangue from the desired minerals.

In a typical ore flotation scheme, the ore is ground to a size sufficiently small to liberate the desired mineral or minerals from the gangue. An additional step in the flotation process involves the removal of the ultra-fine particles by desliming. Ultra-fine particles are generally defined as those less than 5 to 10 microns in diameter. The desliming process may be accompanied by or followed by a flocculation step or some other type of settling step such as the use of a cyclone separating device. This step is followed by a flotation step wherein gangue materials are separated from the desired mineral or minerals in the presence of collectors and/or frothers.

It has been conventional in many flotation systems to use naturally derived substances such as starches, dextrins and gums as depressants. In some countries, there is a prohibition against using substances such as starch which have food value in this type of commercial application.

Corn fiber is a low value byproduct of the corn milling process that is commonly blended with steep liquor and used as animal feed. The major components of corn fiber are cellulose, hemicellulose, protein, oil, lignin and starch. Hemicellulose is typically isolated from corn fiber by an alkaline hydrogen peroxide process (AHP). In AHP, corn fiber is mixed with alkaline solution and peroxide at high temperature. The resulting product contains a solid portion and a liquid portion, which contains the hemicellulose. The solid portion may be separated from the liquid portion, but separation can be cumbersome because the dissolved organic solid content is low and only from about 50-75% of the corn fiber dissolves in the reaction medium.

BRIEF SUMMARY

Disclosed herein are agglomerated hemicellulose compositions comprising agglomerates, wherein at least about 50% of the agglomerates are retained on a 20 mesh sieve, at least about 90% of the agglomerates are retained on a 100 mesh sieve, and the size of the agglomerates ranges from 0.1-15 mm. The agglomerated hemicellulose compositions may be used as depressants, or in depressant compositions, in mineral ore flotation processes.

Methods for preparing an agglomerated hemicellulose composition are also disclosed, the methods comprising:
(a) providing new or undigested plant material comprising hemicellulose;
(b) combining new or undigested plant material comprising hemicellulose with a granulation fluid comprising a solvent, a caustic agent, and optionally an oxidizing agent and/or sequestering agent;
(c) agglomerating the new or undigested plant material comprising hemicellulose with the granulation fluid to form an agglomerated hemicellulose composition comprising agglomerates; wherein step (b) occurs before or simultaneously with step (c).

Also disclosed are processes for enriching a desired mineral from an ore comprising the desired mineral, wherein the process comprises carrying out a flotation process in the presence of one or more collecting agents and an exemplary agglomerated hemicellulose composition described herein or a depressant composition comprising agglomerated hemicellulose.

The disclosure may be understood more readily by reference to the following detailed description of the various features of the disclosure and the examples included therein.

DETAILED DESCRIPTION

Figure 1:
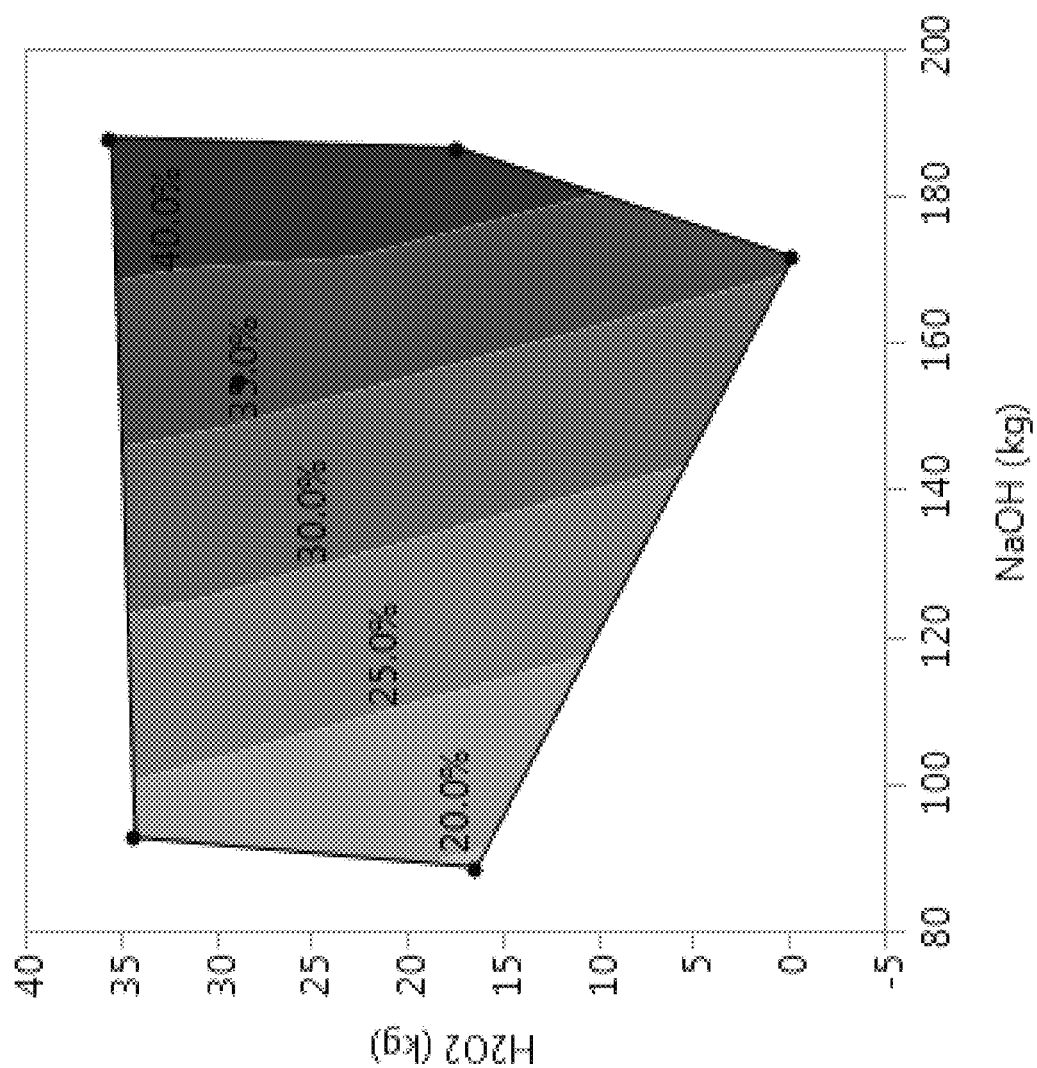
FIG. 1: shows a plot of fiber extraction as a function of $H_2O_2$ loading vs. NaOH loading applied to 1000 kg of dry cob.

Described herein are agglomerated hemicellulose compositions, and methods of using the compositions as depressants, or in depressant compositions, in mineral ore flotation processes. In particular, the agglomerated hemicellulose compositions contain partially or totally liberated hemicellulose and may be in the form of a granule or pellet. The agglomerated hemicellulose compositions offer advantages in bulk solid properties and product handling.

Definitions

As used herein, "agglomerate" refers to a product of size enlargement, i.e. agglomeration. Agglomerates include, for example, pellets, balls or spheres, logs, cylinders, granules and the like.

As used herein, "agglomeration" refers to size enlargement; the process of gathering fine particles into permanent larger shapes in which individual particles can still be distinguished. Agglomeration encompasses pelletization and granulation, described in more detail below.

As used herein, "hemicellulose" refers to the heteropolymer polysaccharide components of plant cell walls other than cellulose. Hemicelluloses have sugars called pentoses such as xylose, each having five carbon atoms as constituent units, sugars called hexoses such as mannose, arabinose and galacturonic acid, each having six carbon atoms as constituent units, and optionally complex polysaccharides such as glucomannan and glucuronoxylan. Hemicellulose can be any of several heteropolymers present in almost all plant cell walls, e.g., xylan, arabinoxylan, glucuronoxylan, glucuronoarabinoxylan. Typically, the main chain (i.e., backbone) is composed of β-1,4-linked D-xylopyranose residues. Besides xylose, hemicelluloses may contain arabinose, glucuronic acid or its 4-O-methyl ether, and acetic, ferulic, and p-coumaric acids. In some cases, the monomers branch off the xylan backbone. The frequency and composition of branches are dependent on the source. All types of hemicellulose may be used in the exemplary embodiments.

As used herein, a "depressant" refers to an agent that depresses the flotation of the desired minerals in preference to depressing the flotation of the associated gangue.

As used herein, the "desired minerals" refers to minerals which have value and may be extracted from ore which contains the desired mineral and gangue. Examples of desired minerals include iron powder, hematite, magnetite, pyrite, chromite, goethite, marcasite, limonite, pyrrohotite or any other iron-containing minerals.

As used herein, "gangue" refers to the undesirable minerals in a material that contains both undesirable and desired minerals, for example an ore deposit. Such undesirable minerals may include oxides of aluminum, silica (e.g., quartz), titanium, sulfur and alkaline earth metals. In certain embodiments, the gangue includes oxides of silica, silicates or siliceous materials.

As used herein, "ore" refers to rocks and deposits from which the desired minerals can be extracted. Other sources of the desired minerals may be included in the definition of "ore" depending on the identity of the desired mineral. The ore may contain undesirable minerals or materials, also referred to herein as gangue.

As used herein, "iron ore" refers to rocks, minerals and other sources of iron from which metallic iron can be extracted. The ores are usually rich in iron oxides and vary in color from dark grey, bright yellow, deep purple, to rusty red. The iron itself is usually found in the form of magnetite (Fe$_3$O$_4$), hematite (Fe$_2$O$_3$), goethite (FeO(OH)), limonite (FeO(OH).n(H$_2$O)), siderite (FeCO$_3$) or pyrite (FeS$_2$). Taconite is an iron-bearing sedimentary rock in which the iron minerals are interlayered with quartz, chert, or carbonate. Itabirite, also known as banded-quartz hematite and hematite schist, is an iron and quartz formation in which the iron is present as thin layers of hematite, magnetite, or martite. Any of these types of iron are suitable for use in processes described herein. In exemplary embodiments, the iron ore is substantially magnetite, hematite, taconite or itabirite. In exemplary embodiments, the iron ore is substantially pyrite. In exemplary embodiments, the iron ore is contaminated with gangue materials, for example oxides of aluminum, silica or titanium. In exemplary embodiments, the iron ore is contaminated with clay.

Method of Preparing Hemicellulose Compositions

In exemplary embodiments, the methods comprise preparing agglomerated hemicellulose composition from plant material comprising hemicellulose, and a granulation fluid comprising a solvent and a caustic agent. The preparation of the agglomerated hemicellulose may be achieved using one of various agglomeration techniques.

In exemplary embodiments, the method comprises providing new or undigested plant material comprising hemicellulose.

Hemicellulose is found in almost all plant cell walls. Accordingly, any plant material comprising hemicellulose can be used in the present method. In exemplary embodiments, the plant material comprising hemicellulose can comprise one type of plant material or a combination of plant materials.

In exemplary embodiments, the plant material is any type of lignocellulosic biomass. Exemplary lignocellulosic biomass sources include, but are not limited to, agricultural residues (e.g., corn stover and wheat straw), hardwoods (e.g., aspenwood) and herbaceous crops (e.g., switchgrass). In a particular embodiment, the plant material is a waste product of industrial processing. Generally, in the methods described herein, the plant material is new material or material which has not been digested, for example digested with at least one caustic agent and, optionally, at least one oxidant. In certain exemplary embodiments, the new or undigested plant material is ground or milled to a desired size before use in the exemplary methods. In certain exemplary embodiments, the new or undigested plant material is not ground or milled before use in the exemplary methods. In certain exemplary embodiments, the new or undigested plant material is treated with an agent that will enhance the extraction or digestion process, for example the plant material is soaked in an oxidant solution or enzyme solution prior to use in the exemplary methods. In certain exemplary embodiments, the new or undigested plant material is washed, for example with water and/or organic solvents, before use in the exemplary methods. In certain exemplary embodiments, the new or undigested plant material is not washed before use in the exemplary methods. In certain exemplary embodiments, the new or undigested plant material is destarched before use in the exemplary methods. In certain exemplary embodiments, the new or undigested plant material is not destarched before use in the exemplary methods.

Exemplary plant materials include, but are not limited to, sugarcane bagasse, wheat straw, corn stover (which may include the stalk, leaves, husk and cob of the corn plant), corn fiber (or corn bran, or corn hull), switch grass, pine wood, aspen wood and spruce wood. In certain exemplary embodiments, the plant material is selected from corn fiber, corn stover, corn bran and mixtures thereof. In certain exemplary embodiments, the plant material comprises or consists essentially of corn fiber, corn stover, corn bran and mixtures thereof. In certain exemplary embodiments, the plant material is corn fiber. In certain exemplary embodiments, the plant material comprises, or consists essentially of, corn fiber. In certain exemplary embodiments, the plant material is corn stover. In certain exemplary embodiments, the plant material comprises or consists essentially of corn stover. In certain exemplary embodiments, the plant material is corn bran. In certain exemplary embodiments, the plant material comprises or consists essentially of corn bran.

Corn fiber comprises a matrix of hemicellulose, cellulose, and lignin. Any corn fiber may be used in the present method, including native corn fiber and corn fiber produced by standard breeding techniques including crossbreeding, translocation, inversion, transformation or any other method of gene or chromosome engineering to include variations thereof. Native corn is intended to mean those varieties found in nature, including dent, waxy, or high amylose corn.

In exemplary embodiments, the corn fiber is milled. Milled corn fiber can be obtained from a wet-milling or a dry-milling process. Accordingly, the corn fiber can be wet or dry. In embodiments, the corn fiber, milled or not milled, can be dried and stored prior to use in the present method.

In exemplary embodiments, the corn fiber can be de-starched. De-starched corn fiber is typically formed by liquefaction with α-amylase until at least part is soluble. Other methods of destarching known in the art are also suitable, including separation of the starch from the fiber, i.e., by hydrocyclone, or by use of other enzyme(s) or combinations thereof.

In exemplary embodiments, the methods comprise combining new or undigested plant material comprising hemicellulose with a granulation fluid comprising a solvent, a caustic agent, and optionally an oxidizing agent and/or a sequestering agent. Granulation fluids are useful in the agglomeration steps described herein by promoting agglomeration by forming physical or mechanical bonds between powder particles, which solidify and form bridges between individual powder particles as the solvent of the granulation fluid evaporates. In the present method, the granulation fluid comprises a solvent and a caustic agent, which also serves to initiate liberation of hemicellulose. In certain exemplary embodiments, the granulation fluid further comprises at least one oxidizing agent. In other exemplary embodiments, the granulation fluid yet further comprises at least one sequestering agent. In further exemplary embodiments, the granulation fluid comprises at least one solvent, at least one caustic agent and at least one oxidizing agent. In yet further exemplary embodiments, the granulation fluid comprises at least one solvent, at least one caustic agent, at least one oxidizing agent and at least one sequestering agent.

In exemplary embodiments, the solvent in the granulation fluid can be any suitable solvent or combination of solvents. For example, water, methanol, ethanol, isopropyl alcohol, acetone and mixtures thereof are suitable for use in the exemplary granulation fluids. In exemplary embodiments, the granulation fluid comprises toxicologically and environmentally acceptable liquids. In one embodiment, water is optionally mixed with a water-miscible, more easily vaporizable organic solvent, such as methanol, ethanol, isopropyl alcohol, or acetone.

In exemplary embodiments, the amount of solvent used can vary. In exemplary embodiments, the solvent is water and is present in an amount from about 1,850 kg/metric ton of dry plant material (e.g., corn fiber) to about 6,000 kg/metric ton of dry plant material, such as, for example, from about 2,000 kg/ton to about 4,000 kg/ton, from about 2,500 kg/ton to about 4,000 kg/ton or from about 3,000 kg/ton to about 3,500 kg/ton.

Any caustic agent or combination of caustic agents can be used in the exemplary granulation fluids. Exemplary caustic agents include, but are not limited to, sodium hydroxide, calcium hydroxide, potassium hydroxide, lithium hydroxide, rubidium hydroxide, cesium hydroxide, magnesium hydroxide, strontium hydroxide, barium hydroxide, a hydrate thereof, an oxide thereof, and mixtures thereof. In exemplary embodiments, the caustic agent comprises, or consists essentially of, sodium hydroxide. In certain embodiments, the caustic agent does not comprise calcium hydroxide.

In exemplary embodiments, the amount of caustic agent used can vary, depending in part on the desired result. In exemplary embodiments, the caustic agent is present in about 2% to about 6% by weight of the granulation fluid, such as, for example, from about 2% to about 4% or about 4% to about 6%.

In exemplary embodiments, the caustic agent is sodium hydroxide and is present in an amount from about 50 kg/metric ton of dry plant material (e.g., corn fiber) to about 250 kg/metric ton of dry plant material, such as, for example, from about 70 kg/ton to about 200 kg/ton, from about 85 kg/ton to about 185 kg/ton, from about 100 kg/ton to about 150 kg/ton, from about 80 kg/ton to about 90 kg/ton, from about 90 kg/ton to about 100 kg/ton, from about 100 kg/ton to about 110 kg/ton, from about 110 kg/ton to about 120 kg/ton, from about 120 kg/ton to about 130 kg/ton, from about 130 kg/ton to about 140 kg/ton, from about 140 kg/ton to about 150 kg/ton, from about 150 kg/ton to about 160 kg/ton, from about 160 kg/ton to about 170 kg/ton, from about 170 kg/ton to about 180 kg/ton, from about 180 kg/ton to about 190 kg/ton, from about 190 kg/ton to about 200 kg/ton, from about 70 kg/ton to about 90 kg/ton, from about 80 kg/ton to about 100 kg/ton, from about 90 kg/ton to about 110 kg/ton, from about 100 kg/ton to about 120 kg/ton, from about 110 kg/ton to about 130 kg/ton, from about 120 kg/ton to about 140 kg/ton, from about 130 kg/ton to about 150 kg/ton, from about 140 kg/ton to about 160 kg/ton, from about 150 kg/ton to about 170 kg/ton, from about 160 kg/ton to about 180 kg/ton, from about 170 kg/ton to about 190 kg/ton or from about 180 kg/ton to about 200 kg/ton.

In certain embodiments, the granulation fluid further comprises at least one oxidizing agent. Any oxidizing agent or combination of oxidizing agents can be used in the exemplary granulation fluids. In exemplary embodiments, the oxidizing agent comprises at least one peroxide. Suitable peroxides include inorganic peroxides and organic peroxides. Exemplary inorganic peroxides include, but are not limited to, bleach (sodium hypochlorite), hydrogen peroxide, sodium peroxide, sodium perborate, sodium percarbonate, sodium persulfate, zinc oxide, barium peroxide and strontium peroxide. Exemplary organic peroxides include, but are not limited to, alkyl hydroperoxides, aryl hydroperoxides, dialkyl peroxides, acyl peroxides, polyperoxides, peroxyesters, allkylidine peroxides, percarboxylic acids and cyclic peroxides.

Other suitable oxidizing agents, or compounds that could produce an oxidant species, include ozone, nitric acid, peroxydisulfuric acid, peroxymonosulfuric acid, chlorite, chlorate, perchlorate, hypochlorite, sodium hypochlorite, calcium hypochlorite, hexavalent chromium compounds (e.g., chromic and dichromic acids, chromium trioxide, pyridium chlorochromate), permanganate, nitrous oxide and potassium nitrate.

In exemplary embodiments, the amount of oxidizing agent used can vary, depending in part on the desired result. In exemplary embodiments, the oxidizing agent is present in about 0.3% to about 1.5% by weight in the granulation fluid, such as, for example, from about 0.3% to about 1.5%, from about 0.5% to about 1.5%, from about 0.5% to about 1.0% or from about 0.5% to about 0.8%.

In exemplary embodiments, the oxidizing agent is $H_2O_2$ and is present in an amount from about 0.1 kg $H_2O_2$/ton of dry plant material (e.g., corn fiber) to about 100 kg $H_2O_2$/ton of dry plant material, such as, for example, from 15 kg/ton to about 100 kg/ton, from 20 kg/ton to about 60 kg/ton, about 20 kg/ton to about 50 kg/ton, about 20 kg/ton to about 40 kg/ton, about 20 kg/ton to about 30 kg/ton, about 30 kg/ton to about 50 kg/ton, about 30 kg/ton to about 40 kg/ton, or about 40 kg/ton to about 50 kg/ton. In exemplary embodiments, from about 15 kg/ton to about 40 kg/ton, or about 30 kg/ton, of hydrogen peroxide is used.

In certain embodiments, the granulation fluid further comprises at least one sequestering agent that is useful in mineral flotation. Exemplary sequestering agents are effective in mitigating the adverse effects of multivalent metal ions on the separation of desired minerals from gangue in a flotation process. In certain embodiments, the exemplary sequestering agents are used to enhance the separation of iron-containing minerals, such as hematite, iron oxides, or iron powder, from quartz or silicate gangue by binding or sequestering multivalent metal ions that interact with the quartz or silicate gangue and diminish its affinity for the collector used in the flotation process. The exemplary sequestering agents may be used to change the flotation characteristics of the quartz or silicate gangue to improve the separation process, particularly in the presence of high concentrations of multivalent metal ions, such as calcium, magnesium, and iron ions.

In exemplary embodiments, the sequestering agent may be any compound which is capable, alone or as a group of compounds, of sequestering a multivalent metal or multivalent metal ion in the form of a metal-chelating agent complex that remains at least partially soluble in the solution. In a particular embodiment, the sequestering agent may be any compound which is capable, alone or as a group of compounds, of sequestering a calcium ion in the form of a metal-chelating agent complex that remains at least partially soluble in the solution.

Any sequestering agent or combination of sequestering agents can be used in the exemplary granulation fluids.

In exemplary embodiments, the sequestering agent is selected from neutral sequestering agents or negatively charged sequestering agents in the form of a salt. In exemplary embodiments, the sequestering agent is selected from the group consisting of ethylenediaminetetraacetic acid (EDTA), and salts and/or hydrates thereof, such as EDTA disodium dihydrate; citric acid, and salts and/or hydrates thereof, such as sodium citrate dihydrate or sodium citrate trihydrate; and polymers comprising one or more sulfonic acid- or carboxylic acid-containing monomers, or a salt thereof.

In exemplary embodiments, the sequestering agent is selected from polymers comprising one or more sulfonic acid- or carboxylic acid-containing monomers, or a salt thereof. In exemplary embodiments, the polymers comprise about 5% to about 100%, or about 10% to about 50%, by mole of the one or more sulfonic acid- or carboxylic acid-containing monomers, with the balance comprised of other monomers. Exemplary polymers comprising one or more sulfonic acid- or carboxylic acid-containing monomers include but are not limited to acrylic acid polymers or salts thereof, such as polyacrylic acid sodium salts; homopolymers or copolymers comprising one or more monomers selected from the group consisting of acrylic acid, maleic anhydride, 2-sulfoethyl methacrylate, methacrylic acid, maleic acid, itaconic acid, 2-acrylamido-2-methylpropane sulfonic acid, sodium allyl sulfonate, 2-hydroxy ethyl acrylate, and salts thereof. The polymers may further comprise other monomers, which are not necessarily involved in chelating, such as acrylamide, allyloxyethanol, and trimethylolpropane allyl ether. In exemplary embodiments, the sequestering agent comprises an acrylic acid polymer or a salt thereof, for example, a sodium salt of polyacrylic acid. In exemplary embodiments, the sequestering agent comprises a polyacrylic acid sodium salt with a weight average molecular weight in the range of about 2000 to about 7000 kDa. In exemplary embodiments, the sequestering agent comprises a polyacrylic acid sodium salt with a weight average molecular weight of about 2200 kDa. In exemplary embodiments, the sequestering agent comprises a polyacrylic acid sodium salt with a weight average molecular weight of about 3500 kDa. In exemplary embodiments, the sequestering agent comprises a polyacrylic acid sodium salt with a weight average molecular weight of about 6500 kDa. In exemplary embodiments, the sequestering agent is selected from polyacrylic acid; copolymers of acrylic acid and one or more monomers selected from the group consisting of maleic anhydride, 2-sulfoethyl methacrylate, methacrylic acid, acrylamide, maleic acid, itaconic acid, 2-acrylamido-2-methylpropane sulfonic acid, sodium allyl sulfonate, 2-hydroxy ethyl acrylate; and salts thereof. In certain exemplary embodiments, the copolymer of acrylic acid is a terpolymer. In exemplary embodiments, the sequestering agent comprises a terpolymer of acrylic acid, maleic anhydride, and 2-sulfoethyl methacrylate with a weight average molecular weight of about 2300 kDa. In exemplary embodiments, the sequestering agent is an acrylic acid polymer, a copolymer of acrylic acid, or a salt thereof. In exemplary embodiments, the sequestering agent is an acrylic acid polymer, a copolymer of acrylic acid, or a salt thereof, and is used as a solution including about 10 to about 80%, or about 40 to about 50%, active polymer or copolymer.

In exemplary embodiments, the amount of sequestering agent used in the granulation can vary, depending on the desired result. In exemplary embodiments, the sequestering agent is present in the granulation fluid at about 2% to about 20% by weight, such as, for example, from about 2% to about 8% or about 5% to about 10%.

In exemplary embodiments, the new or undigested plant material comprising hemicellulose and the granulation fluid are combined, pre-mixed or conditioned prior to agglomeration. Such processes can be performed in, e.g., a pin mixer or a ribbon mixer. The combined, pre-mixed or conditioned material can then be transferred to the equipment that carries out the agglomeration step in, e.g., an extruder. In other exemplary embodiments, the new or undigested plant material comprising hemicellulose is not conditioned prior to agglomeration. Rather, the new or undigested plant material comprising hemicellulose and granulation fluid are first introduced in the agglomeration step in, e.g., a pan granulator.

In exemplary embodiments, agglomeration is achieved by wet granulation, or by agitation of the new or undigested plant material comprising hemicellulose with the granulation fluid. Wet granulation proceeds by a number of mechanisms for agglomerate growth and disintegration, the roles of which are dependent on the granulation equipment as well as the properties of the feed material. Agglomerate formation and growth of these powders can be described by the two growth mechanisms: nucleation of particles and coalescence between agglomerates.

In exemplary embodiments, the methods can be carried out in any type of equipment adapted for the agitation of powders, and the wetting of powders with liquids. Common types of equipment which may be used include mixers, high-shear mixers, fluid-bed granulators, and rotary granulators. In certain exemplary embodiments, the method comprises the addition of the granulation fluid to the new or undigested plant material comprising hemicellulose by spraying the fluid through a nozzle onto the new or undigested plant material comprising hemicellulose. Several types of granulation machines are equipped to allow this method, including most rotary granulators, high-shear mixers, and top-spray fluid-bed granulators.

Wet granulation provides granules, which are a type of agglomerate. "Granules," as used herein, refers to a product of size-enlargement/agglomeration process characterized by a size distribution within a range of about 0.1 mm to about 15 mm, such as, for example, from about 1 mm to about 5 mm, from about 2 mm to about 6 mm and from about 5 mm to about 10 mm.

In exemplary embodiments, the wet granules contain from about 65% to about 90% water content by weight, such as, for example, from about 70% to about 90%, from about 75% to about 90%, from about 80% to about 90% and from about 85% to about 90%. In certain exemplary embodiments wherein the plant material comprising hemicellulose comprises or consists essentially of corn fiber, the granule water content is from about 65% to about 75% by weight. In certain exemplary embodiments wherein the plant material comprising hemicellulose comprises or consists essentially of corn cob, the granule water content is from about 75% to about 80% by weight. The water content of the granules can be measured by comparing the weight of the granules before and after drying, e.g. in an oven overnight at 115° C.

In exemplary embodiments, 1 mm to 6 mm wet granules produced by the methods disclosed herein have a water content from about 75% to about 77% by weight. In other exemplary embodiments, 2 mm to 6 mm wet granules produced by the methods disclosed herein have a water content from about 77% to about 79% by weight. In still further exemplary embodiments, 5 mm to 10 mm wet granules produced by the methods disclosed herein have a water content from about 79% to about 81% by weight.

In exemplary embodiments, the wet granules can be heated after formation to remove some or all of the granulation fluid, thus providing dried granules. Not wishing to be bound by theory, it is believed that, as the wet granules are heated, the chemical reaction of hemicellulose liberation occurs. The dried granules contain the soluble hemicellulose. Several types of granulation machines are equipped for this purpose, such as, for example, a fluid-bed granulator. In these embodiments, the heating step can be carried out without interruption or product transfer. In other embodiments, the granules can be heated by any method known in the art, such as, for example, using hot air, microwaves or infrared light. In certain exemplary embodiments, a portion of the granulation fluid is removed by heating. In other exemplary embodiments, the granules are heated until substantially dry, i.e. the granules contain less than 1% solvent content.

In exemplary embodiments, the wet granules are heated at temperatures from about 80° C. to about 150° C., such as, for example, from about 80° C. to about 120° C., from about 80° C. to about 115° C. or from about 80° C. to about 110° C.

In exemplary embodiments, the amount of time that the wet granules are heated can vary, and depends, for example, on the drying method/equipment, heating temperature and the type and amount of plant material, caustic base and optionally, oxidizing agent. In exemplary embodiments, the reaction mixture is heated from about 45 minutes to about 24 hours, such as, for example, about 45 minutes to 1 hour or about 1 hour to about 20 hours.

The dried granules comprise a soluble fiber portion and an insoluble fiber portion. The soluble fiber portion is hemicellulose. The insoluble fiber portion comprises insoluble cellulose and other insoluble fibers. In exemplary embodiments, the soluble fiber (hemicellulose) content of the dried granules ranges from 20% to about 50%, such as, for example, from about 20% to about 30%, from about 20% to about 40%, from about 30% to about 50%, from about 30% to about 40% or from about 40% to about 50%.

In other exemplary embodiments, agglomeration is achieved by pelletization. "Pellets", as used herein, refer to agglomerates with a more narrow size range compared to granules, for example from about 0.5 mm to about 2.0 mm, and a lower porosity compared to granules. Pelletization can be achieved by any known method, including pressurized agglomeration and non-pressurized agglomeration techniques.

In exemplary embodiments, pelletization is carried out using a pressure agglomeration method, such as, for example, extrusion or extrusion-spheronization. In an exemplary extrusion method, a wet mass comprising the new or undigested plant material comprising hemicellulose and the granulation fluid are forced through a die at high pressure. As the compacted cylinder of mass is forced out of the extrusion die, it is sheared off, resulting in highly compacted pellets. The extruded pellets may have a predetermined shape and size, depending at least in part on the configuration of the extruded die. The extruded pellets may be used in this form, or subject to further processing. For example, spheronization of the pellets can form the extruded pellets into ball-shaped pellets.

In exemplary embodiments, pelletization is carried out using a non-pressure agglomeration technique, such as tumble-grown agglomeration. Non-pressure pelletizers suitable for this purpose include, but are not limited to, disc pelletizers and rotary drums.

In exemplary embodiments, the new or undigested plant material comprising hemicellulose and the granulation fluid are combined, premixed or conditioned prior to pelletization to evenly distribute the granulation fluid. The combined, premixed or conditioned material can then be transferred to the pelletizer.

In other exemplary embodiments, the new or undigested plant material comprising hemicellulose is not conditioned prior to pelletization. Rather, the new or undigested plant material comprising hemicellulose and granulation fluid are first introduced in the pelletizer. In exemplary embodiments, the plant material comprising hemicellulose can be fed into the pelletizer at a continuous or discontinuous rate. In exemplary embodiments, the granulation fluid can also be added at a continuous or discontinuous rate.

In exemplary embodiments, pelletization proceeds until pellets have reached the desired size. In certain exemplary embodiments, pellets produced by the exemplary methods range in size from about 0.5 mm to about 2.0 mm.

In exemplary embodiments, the wet pellets can be heated after formation to remove some or all of the granulation fluid, thus providing dried pellets. In exemplary embodiments, the heating step can be carried out without interruption or product transfer. In exemplary embodiments, the pellets can be heated by any method known in the art, such as, for example, using hot air, microwaves or infrared light. Duration and temperature of heating can vary as set forth above for granules.

The dried pellets comprise a soluble fiber portion and an insoluble fiber portion. The soluble fiber portion is hemicellulose. The insoluble fiber portion comprises insoluble cellulose and other insoluble fibers. In exemplary embodiments, the soluble fiber content of the dried pellets ranges from 20% to about 50%, such as, for example, from about 20% to about 30%, from about 20% to about 40%, from about 30% to about 50%, from about 30% to about 40% or from about 40% to about 50%.

In exemplary embodiments, the duration of agglomeration of the new or undigested plant material comprising hemicellulose and granulation fluid can vary, depending on the amount of feed material, the equipment used and the desired product. In exemplary embodiments, the agglomeration is carried out for at least 5 minutes, such as, for example, at least 15 minutes, at least 30 minutes, at least 1 hour, at least 8 hours, at least 16 hours or at least 25 hours.

In exemplary embodiments, the temperature of the agglomeration can also vary. In exemplary embodiments, the agglomeration temperature is about room temperature (20° C.). In other exemplary embodiments, the temperature is elevated above room temperature, such as, for example, greater than about 40° C., about 50° C., about 60° C., about 70° C., about 80° C. about 90° C. or about 150° C. In still other exemplary embodiments, the agglomeration is carried out below room temperature, such as, for example below about 20° C., about 10° C. or about 5° C.

In exemplary embodiments, the particle size of the resulting agglomerates can be adjusted by selecting the appropriate sieve, or by drying the mass prior to sieving. In exemplary embodiments, at least about 50% of the agglomerates produced by the methods described herein are retained on a 100 mesh sieve, such as, for example, at least about 60%, at least about 70%, at least about 80% or at least about 90%. In exemplary embodiments, at least about 90% of the agglomerates produced by the methods herein are retained on a 20 mesh sieve, such as, for example at least about 93%, at least about 95%, at least about 97% or at least about 98%.

In certain exemplary embodiments, a method for preparing a granulated hemicellulose composition comprises:

(a) providing new or undigested plant material comprising hemicellulose;

(b) combining new or undigested plant material comprising hemicellulose with a granulation fluid comprising a solvent, a caustic agent and optionally an oxidizing agent and/or a sequestering agent;

(c) granulating the new or undigested plant material comprising hemicellulose by adding the granulation fluid to form a wet granulated hemicellulose composition; and (d) optionally heating the wet granulated hemicellulose composition to provide a dried granulated hemicellulose composition comprising granules;

wherein step (b) occurs before or simultaneously with step (c).

In certain exemplary embodiments, a method for preparing a pelletized hemicellulose composition comprises:

(a) providing new or undigested plant material comprising hemicellulose;

(b) combining new or undigested plant material comprising hemicellulose with a granulation fluid comprising a solvent, a caustic agent and optionally an oxidizing agent and/or a sequestering agent;

(c) pelletizing the new or undigested plant material comprising hemicellulose by adding the granulation fluid to form a wet pelletized hemicellulose composition; and (d) optionally heating the wet pelletized hemicellulose composition to provide a dried pelletized hemicellulose composition comprising pellets;

wherein step (b) occurs before or simultaneously with step (c).

In exemplary embodiments, an agglomerated hemicellulose composition is produced by the methods disclosed herein. In certain exemplary embodiments, a pelletized hemicellulose composition is produced by the methods disclosed herein. In other certain exemplary embodiments, a granulized hemicellulose composition is produced by the methods disclosed herein.

The agglomerated hemicellulose compositions, e.g. the pelletized hemicellulose compositions and granulized hemicellulose compositions, contain hemicellulose that is partially or totally liberated from the new or undigested plant material comprising hemicellulose. In certain exemplary embodiments, the agglomerated hemicellulose composition comprises partially liberated hemicellulose. In certain other exemplary embodiments, the agglomerated hemicellulose composition comprises totally liberated hemicellulose.

In exemplary embodiments, the weight average molecular weight of the hemicellulose in the composition is in the range of about 50 to about 1,000 kDa, such as, for example, about 100 to about 500 kDa, about 100 to about 1,000 kDa or about 100 to about 600 kDa.

Depressant Compositions

Agglomerated hemicellulose compositions, including those resulting from the exemplary methods described herein, can be used as depressants, or in depressant compositions, which can be useful in mineral flotation.

In particular, the depressant compositions are effective in selectively depressing the flotation of desired mineral(s). In exemplary embodiments, the depressant compositions are used to enhance the separation of iron-containing minerals, such as iron oxides or iron powder, from silicate gangue by differentially depressing the flotation of the iron-containing minerals relative to that of the silicate gangue. One of the problems associated with the separation of iron-containing minerals from silicate gangue is that the iron-containing minerals and silicates both tend to float under certain processing conditions. In exemplary embodiments, the depressant compositions described herein can be used to change the flotation characteristics of the iron-containing minerals relative to silicate gangue, to improve the separation process. In exemplary embodiments, a process for enriching a desired mineral from an ore comprising the desired mineral and gangue comprises carrying out a flotation process in the presence of one or more collecting agents and one or more depressants, wherein at least one of the one or more depressants comprises an agglomerated hemicellulose composition according to the embodiments described herein.

In exemplary embodiments, a depressant composition comprises an agglomerated hemicellulose composition resulting from the exemplary methods (e.g. wet or dried granules or pellets), and optionally, a solvent. In exemplary embodiments, a solvent may be added to a dried agglomerated hemicellulose composition resulting from the exemplary methods. In exemplary embodiments, the solvent is water. In one embodiment, the depressant composition is in the form of a liquid. In another embodiment, the depressant composition is in the form of a gel. In another embodiment, the depressant composition is in the form of a solid. In a more particular embodiment, the depressant composition is in the form of a water-soluble gel. In exemplary embodiments, the depressant composition comprises an agglomerated hemicellulose composition that has been formed by wherein pelletization is achieved by extrusion, extrusion-spheronization or tumble-growth agglomeration. In certain embodiments, the extruded agglomerated hemicellulose composition may be used directly in the processes described herein.

In exemplary embodiments, the depressant composition may be formulated to provide a sufficient amount of depressant to a flotation process, i.e., an amount sufficient to produce a desired result.

In exemplary embodiments, the depressant composition can include one or more depressants in addition to the exemplary agglomerated hemicellulose composition. Suitable depressants include, but are not limited to, starch; starch activated by treatment with alkali; cellulose esters, such as carboxymethylcellulose and sulphomethylcellulose; cellulose ethers, such as methyl cellulose, hydroxyethylcellulose and ethyl hydroxyethylcellulose; hydrophilic gums, such as gum arabic, gum karaya, gum tragacanth and gum ghatti, alginates; starch derivatives, such as carboxymethyl starch and phosphate starch; and combinations thereof.

In exemplary embodiments, the depressant composition may also include one or more agents or modifiers. Examples of such agents or modifiers include, but are not limited to, frothers, activators, collecting agents, depressants, dispersants, acidic or basic addition agents, or any other agent known in the art.

In exemplary embodiments, the amount of depressant composition to be used is that which will depress the flotation of the desired mineral ore or ores to a necessary or desired extent. The amount of depressant composition needed will depend, at least in part, on a number of factors such as the desired mineral and gangue to be separated and the conditions of the flotation process. In exemplary embodiments, the amount of depressant composition used in the flotation process is about 150 g to about 3,000 g per metric ton of ore to be floated, such as, for example, from about 600 to about 1,000 g, from about 600 g to about 800 g or about 600 g.

The amount of depression achieved with the depressant composition may be quantified. For example, a percent of depression may be calculated by measuring the weight percent of the particular mineral or gangue floated in the absence of any depressant and measuring the weight percent of the same mineral or gangue floated in the presence of a depressant. The latter value is subtracted from the former; the difference is divided by the weight percent floated without any depressant; and this value is multiplied by 100 to obtain the percent of depression. In exemplary embodiments, the percent of depression may be any amount that will provide a necessary or desired amount of separation to enable separation of the desirable minerals from gangue.

In exemplary embodiments, the depressant composition causes the flotation of desirable minerals to be depressed by at least about 10%, such as, for example, about 20% or greater, about 30% or greater, about 40% or greater, about 50% or greater, about 60% or greater, about 70% or greater or about 80% or greater.

In exemplary embodiments, the depressant composition causes the flotation of the gangue to be depressed by about 50% or less, such as, for example, about 40% or less, about 30% or less, about 20% or less, about 10% or less or about −10% or less.

Ore Processing

According to exemplary embodiments, a flotation process may use the exemplary agglomerated hemicellulose or exemplary depressant compositions described herein. As discussed above, flotation is a commonly used process for separating or concentrating desirable minerals from ore, for example iron from taconite. Flotation processes take advantage of the differences between the hydrophobicity of the desired minerals and that of the gangue to achieve separation of these materials. Such differences can be increased with the use of surfactants and flotation agents, including but not limited to collecting agents and depressants (also called depressing agents).

Generally, a flotation process may include the steps of grinding crushed ore, classifying the ground ore in water, treating the classified ore by flotation to concentrate one or more minerals in the froth while the remainder of the minerals of the ore remain in the water pulp, and collecting the minerals in the froth and/or pulp. Some of these steps are described in more detail below.

In exemplary embodiments, a flotation process comprises separating the gangue from the desirable mineral concentrate by floating the gangue in the froth and recovering the desirable mineral concentrate as the underflow. In other exemplary embodiments, a flotation process comprises separating the gangue from the desirable mineral concentrate by inducing the gangue to sink to the bottom of the cell (as underflow) and recovering the desirable mineral concentrate as the overflow (froth). In exemplary embodiments, the flotation process comprises separating iron concentrates from silica and other silaceous materials by flotation of the silica and recovering the iron concentrate as underflow.

In exemplary embodiments, a process for enriching a desired mineral from an ore having the desired mineral and gangue includes carrying out a flotation process in the presence of one or more collecting agents and one or more exemplary agglomerated hemicellulose or exemplary depressant compositions described herein.

In exemplary embodiments, the desired mineral is an iron-containing mineral, such as iron oxides or iron powder.

In exemplary embodiments, a process for enriching an iron-containing mineral from an ore having the iron-containing material and silicate-containing gangue includes carrying out a flotation process in the presence of one or more collecting agents and one or more exemplary depressant compositions described herein.

In exemplary embodiments, the flotation process is a reverse or inverted flotation process, for example a reverse cationic flotation process. In such processes, the flotation of the desired mineral is selectively depressed when compared to the flotation of the gangue so as to facilitate separation and recovery of the desired mineral.

In exemplary embodiments, the flotation process is a direct flotation process, for example a cationic or anionic flotation process.

In exemplary embodiments, the depressant composition may be added at any stage of the process prior to, or during, the flotation step. In certain embodiments, the depressant composition may be added before or with the addition of the collecting agents.

In an exemplary process, various agents and modifiers may be added to the ore that is dispersed in water (flotation pulp), and air is introduced into the pulp to form a froth. The resulting froth contains those materials which are not wetted and have an affinity for air bubbles. Examples of such agents and modifiers include but are not limited to frothers, activators, collecting agents, depressants, dispersants, acidic or basic addition agents, or any other agent known in the art.

In exemplary embodiments, a collecting agent or collector may be added to the flotation pulp. Generally, collecting agents may form a hydrophobic layer on a given mineral surface in the flotation pulp, which facilitates attachment of the hydrophobic particles to air bubbles and recovery of such particles in the froth product. Any collecting agent may be used in the exemplary processes. The choice of collector will depend, at least in part, on the particular ore to be processed and on the type of gangue to be removed. Suitable collecting agents will be known to those skilled in the art. In exemplary embodiments, the collecting agents may be compounds comprising anionic groups, cationic groups or non-ionic groups. In certain embodiments, the collecting agents are surfactants, i.e., substances containing hydrophilic and hydrophobic groups linked together. Certain characteristics of the collecting agent may be selected to provide a selectivity and performance, including solubility, critical micelle concentration and length of carbonic chain.

Exemplary collecting agents include compounds containing oxygen and nitrogen, for example compounds with amine groups. In exemplary embodiments, the collecting agents may be selected from the group consisting of: ether amines, for example primary ether monoamines, and primary ether polyamine; aliphatic $C_8$-$C_{20}$ amines for example aliphatic amines derived from various petroleum, animal and vegetable oils, octyl amine, decyl amine, dodecyl amine, tetradecyl amine, hexadecyl amine, octadecyl amine, octadecenyl amine and octadecadienyl amine; quaternary amines for example dodecyl trimethyl ammonium chloride, coco trimethyl ammonium chloride, and tallow trimethyl ammonium sulfate; diamines or mixed amines for example tallow amine, hydrogenated tallow amine, coconut oil or cocoamine, soybean oil or soya-amine, tall oil amine, rosin amine, tallow diamine, coco diamine, soya diamine or tall oil diamines and the like, and quaternary ammonium compounds derived from these amines; amido amines and imidazolines such as those derived from the reaction of an amine and a fatty acid; and combinations or mixtures thereof. In an exemplary embodiment, the collecting agent is an ether amine or mixture of ether amines.

Exemplary collecting agents may be partially or wholly neutralized by a mineral or organic acid such as hydrochloric acid or acetic acid. Such neutralization facilitates dispersibility in water. In the alternative, the amine may be used as a free base amine by dissolving it in a larger volume of a suitable organic solvent such as kerosene, pine oil, alcohol, and the like before use. These solvents sometimes have undesirable effects in flotation such as reducing flotation selectivity or producing uncontrollable frothing. Although these collecting agents differ in structure, they are similar in that they ionize in solution to give a positively charged organic ion.

According to the exemplary embodiments, the quantity of collecting agent may vary over a wide range, depending in part on the desired result. The amount of collecting agent may depend, at least in part, upon the gangue content of the ore being processed. For example, ores having higher silica content may require greater quantities of collecting agents. In exemplary embodiments, about 300 g to about 500 g of collecting agent per metric ton of ore is used in the flotation, such as, for example about 400 g of collecting agent per metric ton of ore. In certain exemplary embodiments, a diamine collecting agent can be used in an amount from about 300 g to about 500 g per metric ton of ore used, such as, for example, about 400 g or about 500 g In exemplary embodiments, one type of collecting agent is used in the process. In exemplary embodiments, two or more collecting agents are used in the process.

In exemplary embodiments, one or more frothing agents are used in the process. Exemplary frothing agents are heteropolar organic compounds which reduce surface tension by being absorbed at air-water interfaces and thus facilitate formation of bubbles and froth. Examples of frothing agents are methylisobutyl carbinol (MIBC); alcohols having 6-12 carbon atoms which optionally are alkoxylated with ethylene oxide and/or propylene oxide; pine oil; cresylic acid; various alcohols and soaps. In exemplary embodiments, about 25 g to about 100 g MIBC frother per ton of ore is used in the process, such as, for example, about 50 g.

According to an exemplary embodiment, after completion of the flotation, a gangue-enriched flotate (froth), for example a silicate-enriched flotate, and a bottom fraction rich in the desired mineral (tailings, underflow), for example iron, are produced.

According to the embodiments, one or more steps may be done prior to the flotation step to prepare the ore for flotation. For example, in one step of the process, the ore can be ground, together with water, to the desired particle size, for example a particle size between about 5 and about 200 µm. Optionally, conditioning agents such as sodium hydroxide and/or sodium silicate may be added to the grinding mill prior to grinding the crude ore. In exemplary embodiment, sufficient water is added to the grinding mill to provide a slurry containing from about 20% to about 40% solids content, such as, for example, from about 20% to about 30%, from about 30% to about 40%, from about 25% to about 30%, from about 30% to about 35% and from about 35% to about 40%. In certain exemplary embodiments, the slurry comprises about 25% solids content.

In exemplary processes, the ground ore may be deslimed. For example, the ground ore may be suspended in water, and fine material may be deslimed, for instance, by filtration, settling, siphoning or centrifuging. In exemplary embodiments, the desliming step may be repeated one or more times.

In exemplary processes, an ore-water slurry may be prepared from the deslimed ore, and one or more depressants may be added to the slurry.

In exemplary embodiments, the exemplary depressant compositions may be added in an amount of about 150 to about 3,000 g per ton of ore, such as, for example, from about 600 g to about 1,000 g, from about 600 g to about 800 g or about 600 g. In exemplary embodiments, the ore-water slurry may be transferred to a flotation cell and the depressant composition added, in dry form or as a pre-dissolved slurry, to the ore water slurry in the flotation cell.

In exemplary embodiments, base or alkali may optionally be added to adjust the pH of the slurry. For example, the slurry may be adjusted to a pH in the range of about 8 to about 11, or about 9 to about 11, or about 10 to about 11. In certain embodiments, the pH is adjusted to about 10.5. In exemplary embodiments, the pH of the slurry in the flotation cell is maintained at between about 8 and about 11 for optimum iron recoveries.

According to the embodiments, in one step of the flotation process, one or more collecting agents may be added, for example after the addition of the depressant composition and any other process agents.

In exemplary embodiments, once all of the processing agents have been added, the mixture is further conditioned or agitated for a period of time before the froth flotation is carried out. If desired, a froth-regulating means can be added on a convenient occasion before the froth flotation.

In exemplary embodiments, the flotation process may be performed in a plurality of flotation processing steps. For example, the flotation process may be performed in flotation units containing a plurality of communicating cells in series, with the first cell(s) being generally used for the rougher flotation, and subsequent cell(s) being used for the cleaner flotation. In exemplary embodiments, each flotation cell may be any flotation equipment, including, for example, the Denver laboratory flotation machine and/or the Wemco Fagergren laboratory flotation machine, in which the slurry mixture is agitated and air is injected near the bottom of the cell as desired.

In exemplary embodiments, before flotation treatment the ore-water slurry comprises about 20 to about 40% by weight solids. The duration of the flotation process depends upon the desired result. In exemplary embodiments, the time of flotation treatment may be from about 1 to 10 minutes for each circuit. The time of the flotation process may depend at least in part upon the gangue content, the grain size of the ore being treated and the number of flotation cells involved.

According to the embodiments, in the rougher flotation treatment, the gangue may be selectively separated from the ore and removed with the flotation froth. The desired mineral concentrate from the flotation treatment is removed as the underflow and isolated as the rougher concentrate. In exemplary embodiments, the concentrate of the desirable mineral in the rougher concentrate is found to contain a sufficiently low quantity of gangue to be suitable for almost any desired use.

In exemplary embodiments, the flotation froth, the rougher concentrate, or both may be further processed. For example, in exemplary embodiments, the overflow or froth from the rougher flotation may be advanced to a first cleaner flotation cell where a second flotation treatment is performed. The underflow from this first cleaning flotation cell is a mineral concentrate identified as the first cleaner middlings, which generally will contain more gangue than the rougher concentrate but significantly less gangue than the original crude ore. The overflow frothing from the first cleaning cell may be advanced to a second cleaning flotation cell where the flotation procedure is repeated and another mineral concentrate is obtained, which is identified as the second cleaner middlings. In exemplary embodiments, the froth flotation cleaning is repeated one or more times. Any or all of the cleaner middlings may be combined with a rougher concentrate to provide an upgraded mineral ore concentrate. The extent to which the rougher concentrate is combined with the various middling fractions will depend upon the desired mineral content of the final product derived from the procedure. As an alternative embodiment, the cleaner middlings may be returned and recycled through the rougher flotation cell to further upgrade these cleaner middlings.

The depressant compositions and processes described herein can be used to provide higher selectivity and desired mineral recoveries as compared to other depressants when used in flotation processes. In exemplary embodiments, the mineral concentrate, e.g., hematite concentrate, that is obtained by the exemplary processes meets the specifications for the steel industry. In exemplary embodiments, the depressant compositions and processes can be used to maximize the iron recovery to increase production of metallic charge per unit ore fed, which may provide increases in production and profitability. In exemplary embodiments, the iron ore flotation process described herein utilizing the exemplary depressant compositions described herein provides 4% or lower $SiO_2$ grade.

The following examples are presented for illustrative purposes only, and are not intended to be limiting.

EXAMPLES

Example 1: Production and Analysis of Granulated Product

Materials

Sample A Corn Fiber (hull): Corn fiber was received as large, dry pieces or flakes. This fiber was milled in a ceramic ball mill to pass a 100 mesh sieve prior to use.

Sample B Corn Fiber (hull): Corn fiber was a fine powder and was used as received.

Sample C Corn Cob: Corn cob product containing only the pith and chaff was obtained and used as received (98.9% passing a 100 mesh sieve, by analysis).

All other reagents were of analytical grade, obtained from commercial suppliers Fisher or Sigma Aldrich, and used as received.

Granulation (Liberation of Hemicellulose; Chemical Bonds to the Insoluble Fiber are Cleaved):

Granulation was performed by hand to replicate a pan granulator. A 270 mesh, 9 inch sieve was used instead of a pan because the smooth bottom of the pan would enable more sliding rather than tumbling of the material. A spray bottle was used to apply granulating solution to the fiber or cob (~50 g). The sieve was shaken vigorously in horizontal circular motions between each spray to ensure even moisture distribution. Spraying continued until adequate granules formed with 1-8 mm diameter. Samples were immediately taken for percent moisture analysis. The moisture content was used to calculate the amount of granulation solution applied.

Sample a Corn Fiber (Hull)

Sample A corn fiber was granulated with DI water to estimate the loading of granulation solution. The percent moisture of the wet granules was 67.8%. The granules were dried in an oven at 115° C. and split into larger (+6 mesh) and smaller (−6 mesh) size lots.

Sample A corn fiber was granulated with 1 M (3.84% weight) NaOH solution and dried in a covered beaker at 110° C. overnight. The granules were split into larger (+6 mesh) and smaller (−6 mesh) size lots.

Sample B Corn Fiber (Hull)

A series of granulation solutions containing NaOH (2.75%-5.49%) and $H_2O_2$ (0.51%-1.04%) were used to granulate Sample B corn fiber. Wet granules made from each granulation solution were split into two lots. One lot was dried in a fluid bed dryer (more efficient drying at low temperature vs oven) at 80° C. for 45 min. The other lot was dried in an open pan in an oven at 115° C. overnight.

Sample C Corn Cob

Sample C corn cob was granulated with DI water to estimate a range of required loading of granulation solution.

A series of samples were taken as water was added and the diameter of the granules increased. The percent moisture of the wet granules was measured to give: 76.7% for 1-6 mm; 78.2% for 2-6 mm, 80.1% for 5-10 mm Sample C corn cob was granulated with 1 M (3.84% weight) NaOH solution and dried in a covered beaker at 110° C. overnight.

A series of granulation solutions containing NaOH (2.28%-5.34%) and $H_2O_2$ (0%-1.02%) were used to granulate the corn cob. Wet granules were dried in a fluid bed dryer (more efficient drying at low temperature vs oven) at 80° C. for 100 min.

Granules containing a sequestering agent for hard ion sequestration were generated by granulating corn cob with a solution containing NaOH (4.59%), $H_2O_2$ (0.86%), and a polyacrylic acid sodium salt ($M_w$~3500 kDa) sequestering agent (7.67%). The wet granules were dried on an open screen in an oven at 115° C. overnight.

Dissolution (Hemicellulose Dissolution and Removal of Insoluble Fiber Residue)

In a centrifuge bottle, DI $H_2O$ and the solid granules produced above (10% by weight) were added and shaken for 2-5 min. The resulting slurry was centrifuged to collect and analyze the liquid. The total dissolved solids value for the liquid was used to calculate the percent water-extractable sample solids and percent fiber extraction. The following data and assumptions are used:

The Fiber:NaOH weight ratio of the sample is known by the ratio of reagents used. Sample moisture is obtained by analysis.

Fiber=Fiber$_{(insoluble)}$+Fiber$_{(soluble)}$. The soluble fiber is hemicellulose.

Sample=(Fiber$_{(insoluble)}$+Fiber$_{(soluble)}$+Sample Moisture$_{(soluble)}$+NaOH$_{(soluble)}$)

The dissolved solids measurement=Fiber$_{(soluble)}$+NaOH$_{(soluble)}$

The percent dissolved solids=(Fiber$_{(soluble)}$+NaOH$_{(soluble)}$)/(total slurry−(Fiber$_{(insoluble)}$))

Therefore, percent total extraction=(Fiber$_{(soluble)}$+NaOH$_{(soluble)}$)/Sample The percent fiber extraction=(Fiber$_{(soluble)}$/Fiber).

With sequestering agent:

Fiber=Fiber$_{(insoluble)}$+Fiber$_{(soluble)}$. The soluble fiber is hemicellulose.

Sample=(Fiber$_{(insoluble)}$+Fiber$_{(soluble)}$+Sample Moisture$_{(soluble)}$+NaOH$_{(soluble)}$+Sequestering Agent$_{(soluble)}$)

The dissolved solids measurement=Fiber$_{(soluble)}$+NaOH$_{(soluble)}$+Sequestering Agent$_{(soluble)}$ The percent dissolved solids=(Fiber$_{(soluble)}$+NaOH$_{(soluble)}$+Sequestering Agent$_{(soluble)}$)/(total slurry−(Fiber$_{(soluble)}$))

Therefore, percent total extraction=(Fiber$_{(soluble)}$+NaOH$_{(soluble)}$+Sequestering Agent$_{(soluble)}$)/Sample The percent fiber extraction=(Fiber$_{(soluble)}$/Fiber).

Results

The granulation process utilized a caustic solution for two purposes: formation of granules from the powdered fiber and even distribution of the caustic reagent. As the wet granules were heated for drying, the chemical reaction of hemicellulose liberation occurs. The dry granules contain the soluble hemicellulose. The high active granular product provides shipping and handling advantages.

The effect of heat and caustic is provided in Table 1, which details the steps used to determine the amount of soluble fiber extracted: (i) granulation conditions reagents, (ii) wet granules treatment and (iii) dissolution conditions.

Corn fiber was granulated with water and split into three lots: 1, 2, and 3. Heat was applied to 2 and 3. Caustic was added to 1 and 3 after heating, upon dissolution measurement of the wet granules. No caustic was applied to 2. The results indicated that caustic can extract about 40% of the corn fiber without heating (1). Little to no fiber could be extracted when heat was applied without caustic (2). Adding caustic after heating (3), was not effective.

TABLE 1

Heat and Caustic in Hemicellulose Liberation

| | | 1 | 2 | 3 |
|---|---|---|---|---|
| Granulation | Process | Granulation | Granulation | Granulation |
| | Fiber Source | Sample A Corn Fiber | Sample A Corn Fiber | Sample A Corn Fiber |
| | Fiber Moisture (%) | 6.60% | 6.60% | 6.60% |
| | Dry Fiber (kg) | 1,000 | 1,000 | 1,000 |
| | NaOH (kg) | 0 | 0 | 0 |
| | Total $H_2O$ (kg) | 2,105 | 2,105 | 2,105 |
| Wet Granules Treatment | Heating/Drying | none | 110° C. | 110° C. |
| | Time | — | ~20 h | ~20 h |
| Dissolution conditions | Total (kg) | 10,321 | 11,122 | 10,116 |
| | Dry granules/Fiber (kg) | 1,000 | 1,000 | 1,000 |
| | NaOH (kg) | 150.1 | 0 | 150.1 |
| | $H_2O$ (kg) | 9,171 | 10,122 | 8,966 |
| Soluble | Fiber (% of dry fiber) | 39.4% | 6.7% | 0.6% |

Two fiber source samples were granulated with weak NaOH aqueous solution (1 M, 3.84%) and dried to generate 6a and 6b (Table 2). A higher content of soluble fiber for 6a (47.9%) compared to 1, 2 and 3 (above), confirmed the advantages of heating with caustic.

TABLE 2

Mild Caustic Granulation

| | | 6a | 6b |
|---|---|---|---|
| Wet Granules (Granulation) | Fiber Source | Sample A Corn Fiber | Sample C Corn Cob |
| | Fiber Moisture (%) | 6.60% | 7.10% |
| | Dry Fiber (kg) | 1,000 | 1,000 |
| | NaOH (kg) | 86 | 137 |
| | $H_2O_2$ (kg) | 0 | 0 |
| | Total $H_2O$ (kg) | 2,214 | 4,132 |
| Treatment of Wet Granules | Temp | 110° C. | 110° C. |
| | Time | ~20 h | ~20 h |
| Resulting Dry Granules | Total (kg) | 1086 | 1137 |
| | Dry Fiber (kg) | 1,000 | 1,000 |
| | NaOH (kg) | 86 | 137 |
| | $H_2O_2$ (kg) | 0 | 0 |
| | Total $H_2O$ (kg) | 0 | 0 |
| Dry Granule Water Insoluble Components | Total (kg) | 566 | 674 |
| | Total (% of Total) | 52.1% | 59.3% |
| Dry Granule Water Soluble Components | Fiber (% of dry fiber)* | 43.4% | 32.6% |
| | Total (%) | 47.9% | 44.6% |

*Hemicellulose

A series of granulation solutions were prepared with varying levels of NaOH and $H_2O_2$. These solutions were used to granulate Sample C corn cob. The resulting dry granules 7-12 are presented in Table 3. A fluidized bed dryer was used due to its higher drying efficiency. While samples were dried for 100 min at 80° C., the granules were dry within 20-30 min.

TABLE 3

Cob granulation series and hemicellulose liberation as fiber extraction.

| | | Sample | | | | | |
|---|---|---|---|---|---|---|---|
| | | 7 | 8 | 9 | 10 | 11 | 12 |
| Wet Granules | Fiber Source | Sample C Corn Cob | | | | | |
| | Fiber Moisture (%) | 7.10 | 7.10 | 7.10 | 7.10 | 7.10 | 7.10 |
| | Dry Fiber (kg) | 1,000 | 1,000 | 1,000 | 1,000 | 1,000 | 1,000 |
| | NaOH (kg) | 88.3 | 154.7 | 186.1 | 92.4 | 187.6 | 171.3 |
| | $H_2O_2$ (kg) | 16.6 | 29.0 | 17.5 | 34.4 | 35.7 | 0.0 |
| | Total $H_2O$ (kg) | 3,842 | 3,292 | 3,362 | 3,395 | 3,367 | 3,615 |
| Treatment of Wet Granules | Temp | 80° C. | 80° C. | 80° C. | 80° C. | 80° C. | 80° C. |
| | Time (min) | 100 | 100 | 100 | 100 | 100 | 100 |
| Resulting Dry Granules | Total (kg) | 1,103 | 1,170 | 1,215 | 1,106 | 1,199 | 1,178 |
| | Dry Fiber (kg) | 1,000 | 1,000 | 1,000 | 1,000 | 1,000 | 1,000 |
| | NaOH (kg) | 88.3 | 154.7 | 186.1 | 92.4 | 187.6 | 171.3 |
| | $H_2O$ (kg) | 14.6 | 15.2 | 29.3 | 13.8 | 11.0 | 6.7 |
| Dry Granule Water Insoluble Components | Total (kg) | 805 | 637 | 568 | 767 | 557 | 645 |
| | Total (% of dry granule) | 73.0% | 54.4% | 46.7% | 69.4% | 46.4% | 54.8% |
| Dry Granule Water Soluble Components | Fiber (% of dry fiber)* | 19.5% | 36.3% | 43.2% | 23.3% | 44.3% | 35.5% |
| | Total (% of dry granule) | 26.0% | 44.9% | 52.2% | 29.8% | 53.1% | 44.9% |

*hemicellulose

Figure 2:
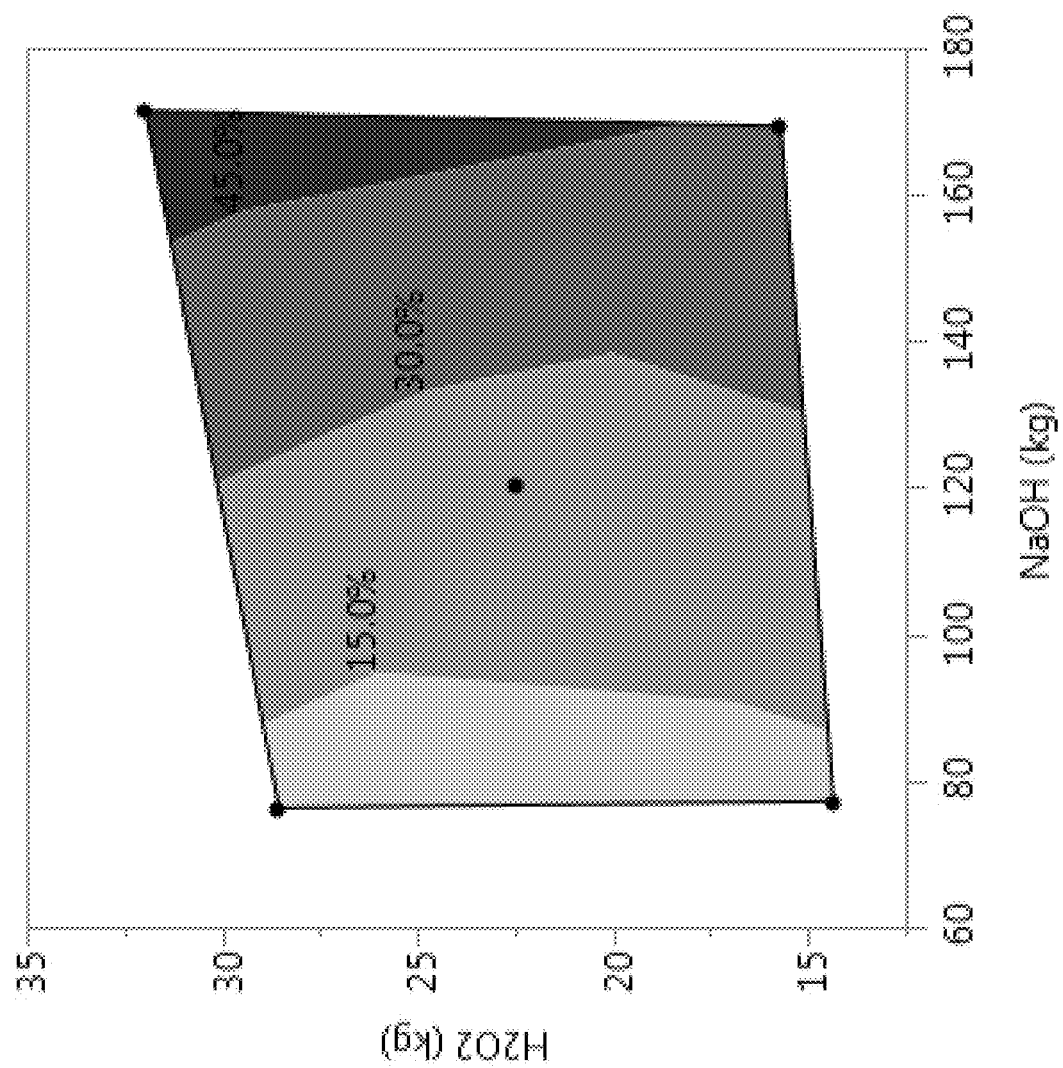
FIG. 2: shows a plot of fiber extraction of corn fiber samples 13-18 as a function of $H_2O_2$ loading vs. NaOH loading applied to 1000 kg of dry corn fiber, dried in a fluidized bed dryer at 80° C. for 45 min.
Figure 3:
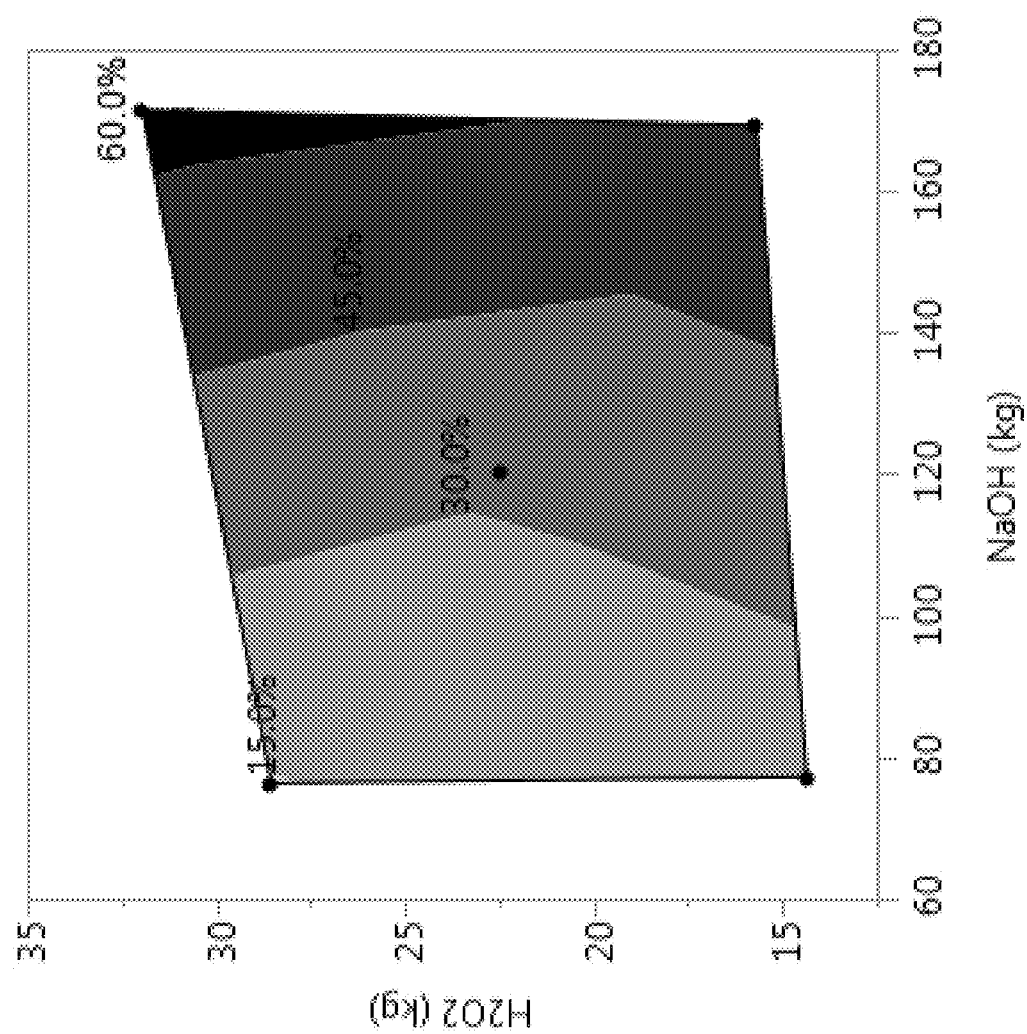
FIG. 3: shows a plot of fiber extraction of corn fiber samples 19-23 as a function of $H_2O_2$ loading vs. NaOH loading applied to 1000 kg of dry corn fiber, dried in an oven at 115° C. for ~20 h.
Figure 4:
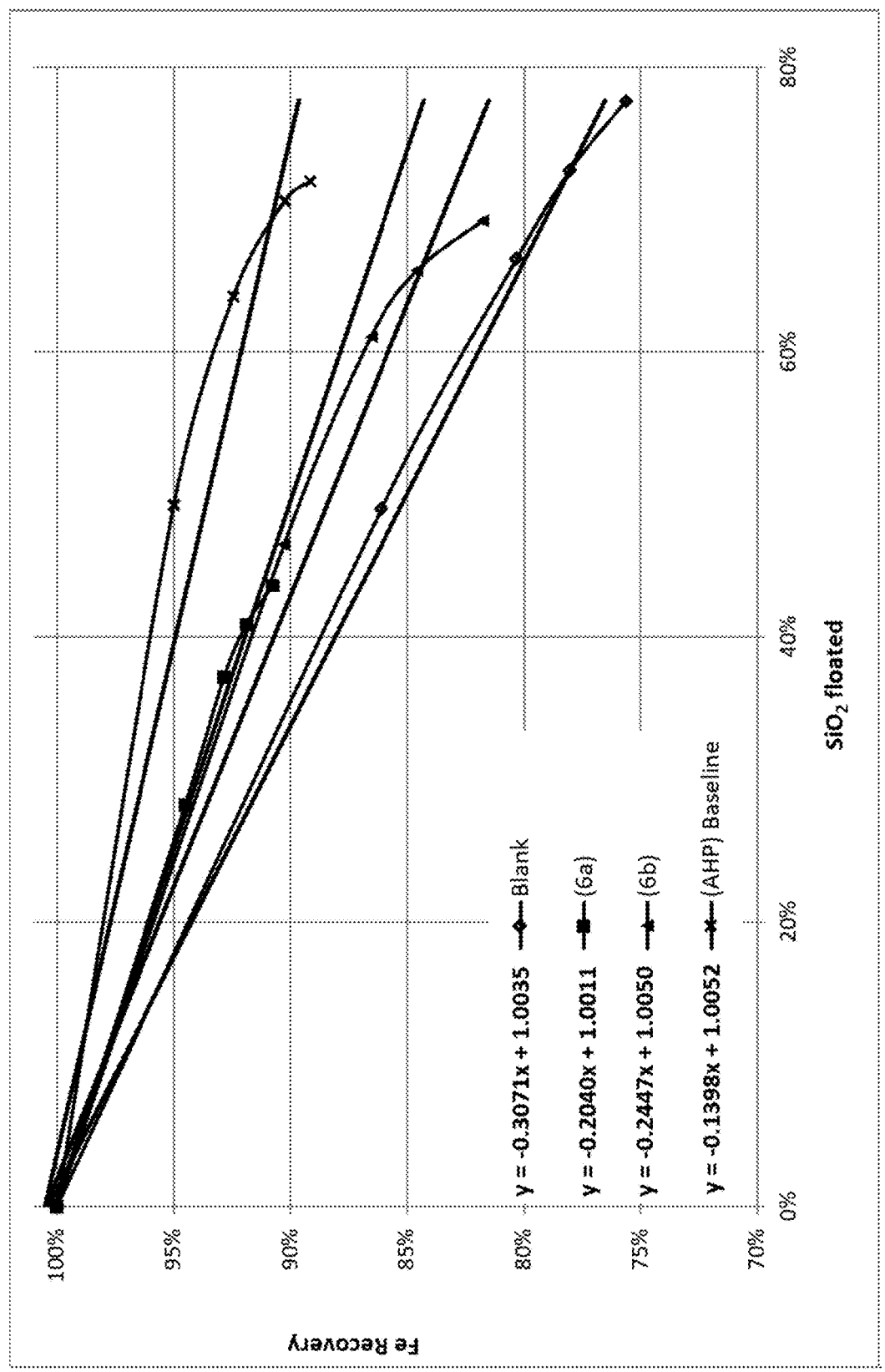
FIG. 4: shows a plot of percent Fe recovery vs. percent $SiO_2$ floated for 6a and 6b.
Figure 5:
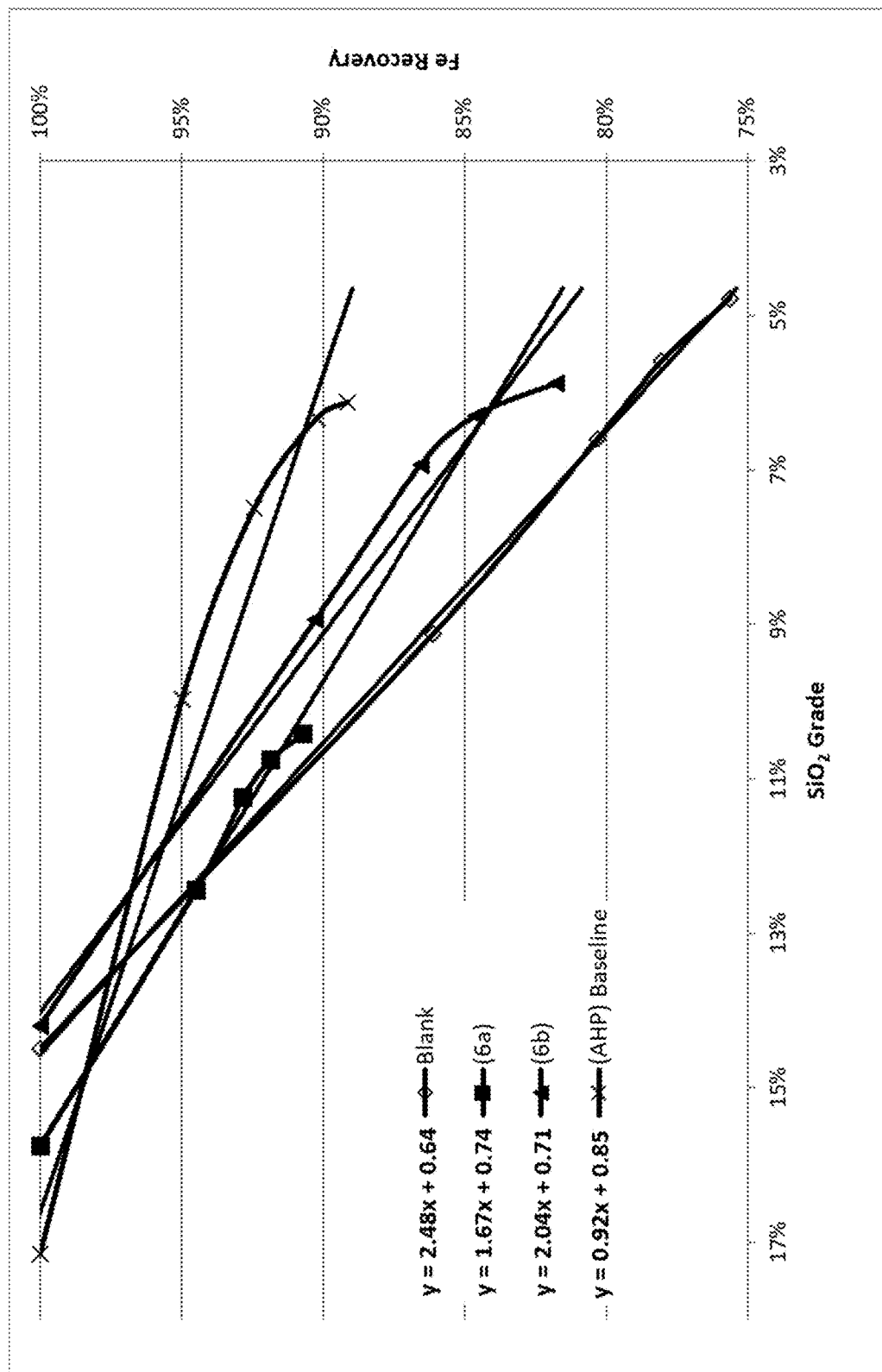
FIG. 5: shows a plot of percent Fe recovery vs. percent $SiO_2$ grade for 6a and 6b.
Figure 6:
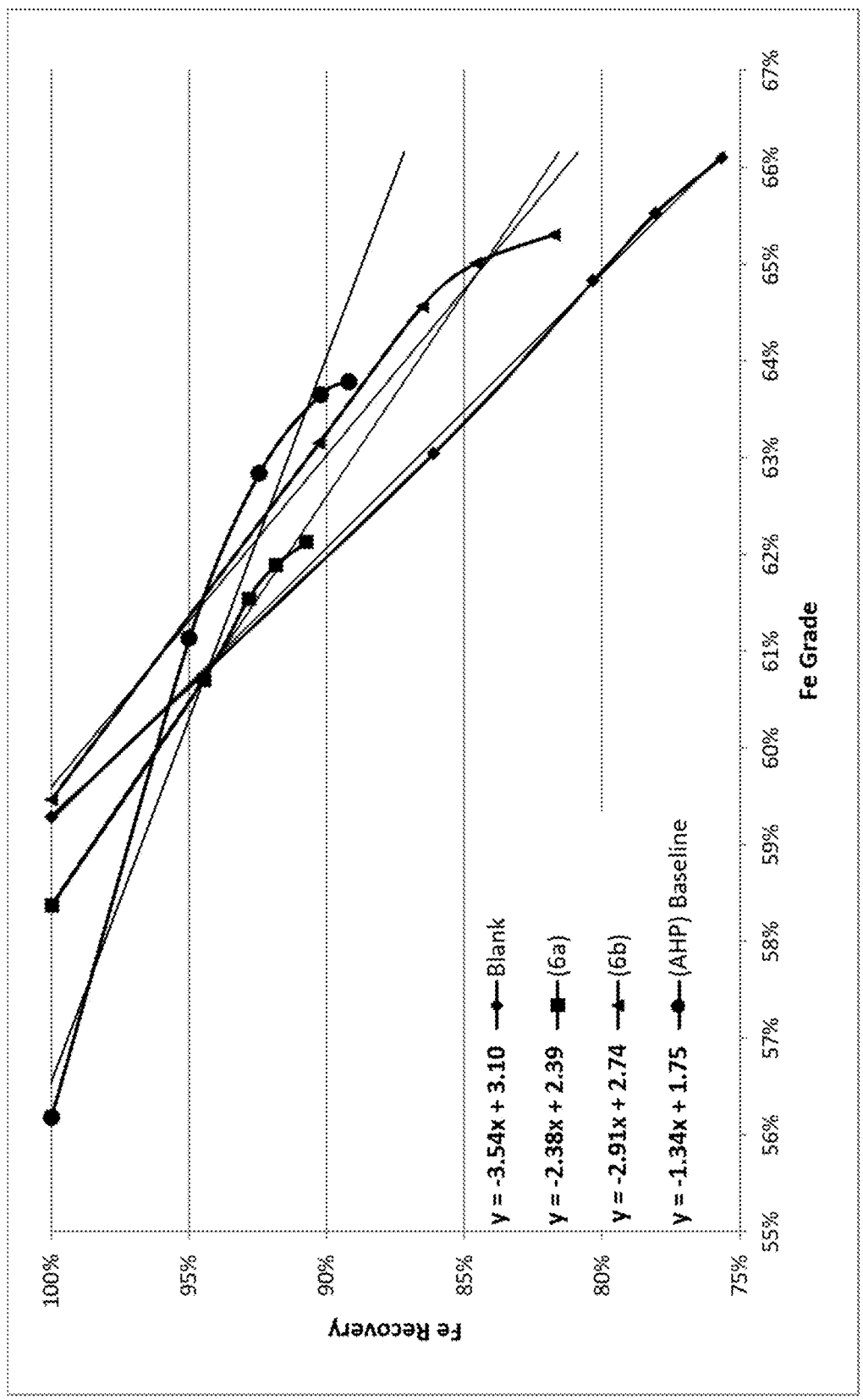
FIG. 6: shows a plot of percent Fe recovery vs. percent Fe grade for 6a and 6b.
Figure 7:
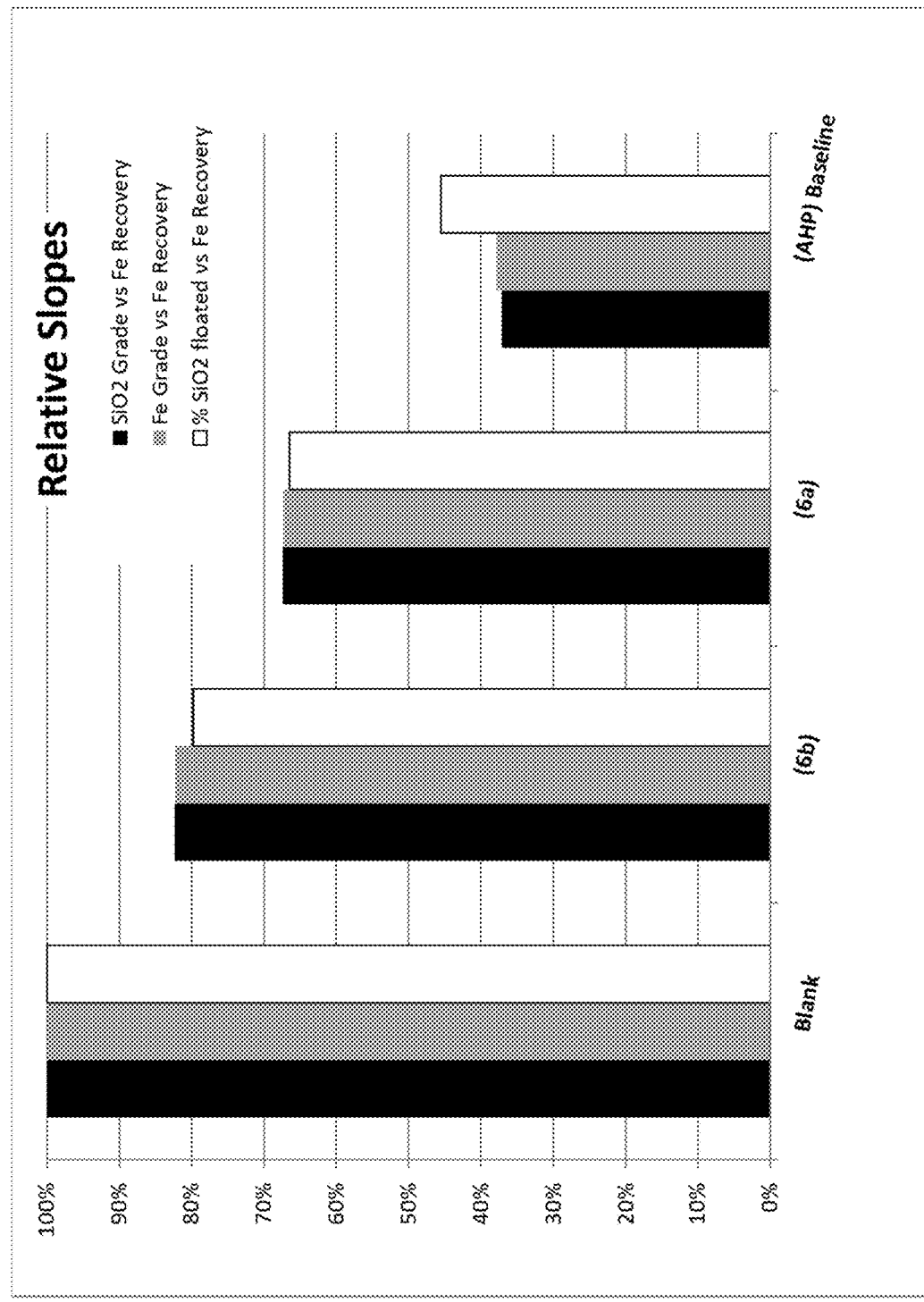
FIG. 7: shows a graph of the relative slopes of 6a and 6b.

The fiber extraction of 7-12 plotted by $H_2O_2$ vs. NaOH is shown in FIG. 1. Fiber extraction was largely dependent on NaOH loading. $H_2O_2$ loading also has a direct, but weaker, relationship with fiber extraction A series of granulation solutions were used to granulate Sample B corn fiber. Wet granules were split into two lots. One lot was dried in the fluidized bed dryer for rapid, low temperature drying to generate 13-18 as shown in Table 4. The other lot was dried in an oven for higher temperature drying to generate 19-23 as shown in Table 5. The resulting fiber extractions are plotted in FIGS. 2 and 3 for samples 13-18 and 19-23, respectively. The higher temperature and longer heating in the oven allowed higher extraction of fiber than was observed for the lower temperature fluidized bed dryer conditions. As seen for cob, fiber extraction is mostly influenced by NaOH loading, with $H_2O_2$ having a more modest effect. Higher extraction was achieved for corn fiber 13 vs cob 11 even with shorter heating time of 45 min vs. 100 min.

TABLE 4

Cob granulation series and hemicellulose liberation as fiber extraction (fluidized bed dryer).

| | | 13 | 14 | 15 | 16 | 17 | 18 |
|---|---|---|---|---|---|---|---|
| Wet Granules | Fiber Source | Sample B Corn Fiber | | | | | |
| | Fiber Moisture (%) | 5.10% | 5.10% | 5.10% | 5.10% | 5.10% | 5.10% |
| | Dry Fiber (kg) | 1,000 | 1,000 | 1,000 | 1,000 | 1,000 | 1,000 |
| | NaOH (kg) | 171.2 | 76.9 | 169.0 | 76.1 | 120.2 | 120.2 |
| | $H_2O_2$ (kg) | 32.1 | 14.5 | 15.8 | 28.7 | 22.6 | 22.6 |
| | Total $H_2O$ (kg) | 2,970 | 2,758 | 2,947 | 2,711 | 2,837 | 2,837 |
| Treatment of Wet Granules | Temp | 80° C. | 80° C. | 80° C. | 80° C. | 80° C. | 80° C. |
| | Time | 45 min | 45 min | 45 min | 45 min | 45 min | 45 min |
| Resulting Dry Granules | Total (kg) | 1,197 | 1,078 | 1,198 | 1,102 | 1,139 | 1,139 |
| | Dry Fiber (kg) | 1,000 | 1,000 | 1,000 | 1,000 | 1,000 | 1,000 |
| | NaOH (kg) | 171.2 | 76.9 | 169.0 | 76.1 | 120.2 | 120.2 |
| | $H_2O$ (kg) | 26.1 | 1.5 | 29.1 | 25.9 | 18.3 | 18.3 |
| Dry Granule Water Insoluble Components | Total (kg) | 467 | 883 | 565 | 902 | 766 | 766 |
| | Total (% of dry granule) | 39.0% | 81.9% | 47.2% | 81.9% | 67.2% | 67.2% |
| Dry Granule Water Soluble Components | Fiber (% of dry fiber)* | 53.3% | 11.7% | 43.5% | 9.8% | 23.4% | 23.4% |
| | Total (% of dry granule) | 60.1% | 18.0% | 51.7% | 16.2% | 31.7% | 31.7% |

*hemicellulose

TABLE 5

Cob granulation series and hemicellulose liberation as fiber extraction (oven-dried).

| | | 19 | 20 | 21 | 22 | 23 |
|---|---|---|---|---|---|---|
| Wet Granules | Fiber Source | Sample B Corn Fiber | | | | |
| | Fiber Moisture (%) | 5.10% | 5.10% | 5.10% | 5.10% | 5.10% |
| | Dry Fiber (kg) | 1,000 | 1,000 | 1,000 | 1,000 | 1,000 |

TABLE 5-continued

Cob granulation series and hemicellulose liberation as fiber extraction (oven-dried).

|  |  | 19 | 20 | 21 | 22 | 23 |
|---|---|---|---|---|---|---|
|  | NaOH (kg) | 171.2 | 76.9 | 169.0 | 76.1 | 120.2 |
|  | H$_2$O$_2$ (kg) | 32.1 | 14.5 | 15.8 | 28.7 | 22.6 |
|  | Total H$_2$O (kg) | 2,970 | 2,758 | 2,947 | 2,711 | 2,837 |
| Treatment of Wet Granules | Temp | 115° C. | 115° C. | 115° C. | 115° C. | 115° C. |
|  | Time | ~20 h | ~20 h | ~20 h | ~20 h | ~20 h |
| Resulting Dry Granules | Total (kg) | 1,171 | 1,077 | 1,169 | 1,076 | 1,120 |
|  | Dry Fiber (kg) | 1,000 | 1,000 | 1,000 | 1,000 | 1,000 |
|  | NaOH (kg) | 171.2 | 76.9 | 169.0 | 76.1 | 120.2 |
|  | H$_2$O (kg) | 0.0 | 0.0 | 0.0 | 0.0 | 0.0 |
| Dry Granule Water Insoluble Components | Total (kg) | 350 | 780 | 429 | 854 | 603 |
|  | Total (% of dry granules) | 29.9% | 72.4% | 36.7% | 79.4% | 53.8% |
| Dry Granule Water Soluble Components | Fiber (% of dry fiber)* | 65.0% | 22.0% | 57.1% | 14.6% | 39.7% |
|  | Total (% of dry granules) | 70.1% | 27.6% | 63.3% | 20.6% | 46.2% |

*hemicellulose

Example 2: Flotation

Materials

Iron ore slurries were obtained from a North America iron producer. The process water was decanted off and the solids were oven dried. The dry solid agglomerates were gently broken by hand to pass a 20-mesh sieve, and repeatedly split in half with a riffle splitter to generate manageable lot sizes of about 1.8 kg, which were thoroughly blended by tumbling in a 1 L bottle. Tap water was used to reconstitute the slurry. Tomamine DA-16 (a synthetic ether diamine collector) and MIBC (Methyl Isobutyl Carbinol, frother) were obtained from Magnetation and diluted with deionized water to 1% aqueous solutions prior to use.

Aqueous alkaline hydrogen peroxide extracted hemicellulose was used for the baseline for flotation. This was prepared from 10% corn fiber (Sample B) by weight in DI water containing 120 kg NaOH, and 45 kg H$_2$O$_2$ per 1,000 kg of corn fiber, heated (65° C.) with stirring for 4 h. Insoluble material (cellulose) was removed by centrifugation. The product solution contained 8.27% dissolved organic solids (largely hemicellulose) and was stored in a refrigerator.

The flotation tests were performed in a 1-liter Metso laboratory flotation cell with continuous agitation at 800 rpm. For the flotation tests, a 50% solid slurry was generated by mixing ore (308 g) and tap water (308 g) in the flotation cell. The pH was adjusted from about 7.3 to 10.5 and maintained at 10.5 with NaOH (25%) solution. In some cases, the pH was not adjusted as indicated by pH values less than 9. After 1 min of mixing, the depressant was added as dry granules, or as a solution (8.27% active) for the aqueous alkaline hydrogen peroxide baseline. The slurry was allowed to condition with the depressant for 5 minutes while maintaining a pH of 10.5 with NaOH. Tap water was added in an amount to target 25% solids after addition of all reagents. The collector (1% solution, Tomamine DA-16) and frother (1.54 mL, 1% solution, 50 g MIBC/ton ore solids) were added and allowed to condition for 1 min while maintaining a pH of 10.5-10.6. Air flow was then initiated to begin flotation. The pH measured prior to flotation was about 10.5-10.6. Four froth (tail) fractions were collected from times: 0 to 30 s; 30 to 60 s; 60 to 90 s; and 90 to 180 s. Air flow was stopped after 180 s. The four tailing samples and concentrate sample were dried, weighed, collected, and analyzed for Fe and Si by X-ray fluorescence (XRF). Initial feed concentrations were calculated based on the sum of all tail and concentrate analyses.

Efficacy can be evaluated by visual inspection of the plot of % Fe Recovery versus % Fe Grade. Iron recovery (% Fe Recovery) is the percent by mass of Fe in the concentrate from the total Fe in the feed. The % Fe Grade is the concentration by mass of the Fe in the total mass of a sample. Since silica removal is the objective, % Fe Recovery versus % SiO$_2$ Grade is also relevant.

Position of the series cannot be directly compared since the feed grades (where recovery=100%) differ. These series are typically curves and require polynomial fits. However, typical curves were not observed and linear fits were used. The slope of the linear regression was used as a numeric approximation of efficacy. The relative slope for a given series was its slope divided by the slope of the blank, expressed as a percent. As slopes or relative slopes approached zero, the change (or loss) in Fe recovery decreased, while the grade improvement increased. Therefore, slopes or relative slopes closer to zero have higher efficacy or performance. Relative slopes were plotted in bar charts for comparison, where values closest to zero indicated the highest efficacy.

The selectivity index (SI) was calculated as shown in Equation 1, where % grades were used for each term. SI is a quick gauge of flotation efficacy. However, it only incorporates % grade and a thorough analysis must include both grade and recovery data $$\text{Selectivity Index} = \sqrt{\frac{Fe_{conc} \times SiO_i}{Fe_{tail} \times SiO_z}} \quad \text{(Equation 1)}$$

Depression of each mineral is another way to gauge performance. Expressed as a percent, depression is calculated as shown in Equation 2, where b is the mineral's weight percent floated without depressant (Blank) and d is the mineral's weight percent floated with the depressant. For reverse flotation of iron ore, high depression values for Fe$_2$O$_3$ and zero or negative depression values for SiO$_2$ indicate a good, selective depressant.

$$\text{Depression} = \frac{b-d}{b} \quad \text{(Equation 2)}$$

Flotation ore samples were analyzed for $Fe_2O_3$ and $SiO_2$ content by XRF analysis.

Total dissolved solid content of a solution was determined as the percent mass remaining after drying the sample to constant mass or overnight in an oven at 105-115° C. The percent moisture of a solid sample was determined in the same way where the percent moisture is the mass loss divided by the initial sample weight.

The results of flotations are presented in Table 6 and FIGS. 4-7. A blank experiment without depressant was used to calculate percent depression. A baseline experiment utilized typical aqueous Alkaline Hydrogen Peroxide depressant was also prepared. The flotation data indicates that the granulated samples 6a and 6b showed improvement over the blank.

TABLE 6

Flotation Results for 6a and 6b

| ID | Depressant | pH | Solids | Mass Recovery | % Depression $Fe_2O_3$ | % Depression $SiO_2$ | Concentrate $SiO_2$ | Concentrate $Fe_2O_3$ | SI | Relative slope $SiO_2^a$ | Relative slope $Fe^a$ | Relative slope $SiO_2^b$ |
|---|---|---|---|---|---|---|---|---|---|---|---|---|
|  | Blank | 8.11 | 25% | 67.9% | 0 | 0 | 4.78% | 94.5% | 3.28 | 100.0% | 100% | 100.0% |
| 6a | Sample A corn fiber | 8.40 | 25% | 82.3% | 62.0% | 43.8% | 10.4% | 88.8% | 2.75 | 67.3% | 67.2% | 66.4% |
| 6b | Sample C corn cob | 8.75 | 25% | 74.5% | 25.1% | 10.9% | 5.88% | 93.4% | 3.17 | 82.3% | 82.2% | 79.7% |
|  | Baseline AHP Depressant | 8.22 | 25% | 78.5% | 32.7% | −24.1% | 6.13% | 91.2% | 4.59 | 37.1% | 37.9% | 45.5% |

Example 3: Production of Granules and Granule Properties

The granule or pellet samples were prepared as described in Example 1. Table 7 contains a summary of agglomerating and drying conditions. Table 8 contains the dry granule properties.

TABLE 7

Agglomeration conditions for wet granules

| ID | Relative Reagent Levels:* NaOH, $H_2O_2$ | Source | Fiber (kg) | NaOH (kg) | $H_2O_2$ (kg) | $H_2O$ (kg) | SA* (kg as dry product) | Moisture (%) | Dry temp (° C.) | Dry Time (min) |
|---|---|---|---|---|---|---|---|---|---|---|
| 1 | LL | Sample C Corn Cob | 1,000 | 88.3 | 16.6 | 3,842 | 0 | 78.0% | 80 | 100 |
| 2 | MM | Sample C Corn Cob | 1,000 | 154.7 | 29.0 | 3,292 | 0 | 74.2% | 80 | 100 |
| 3 | HL | Sample C Corn Cob | 1,000 | 186.1 | 17.5 | 3,362 | 0 | 74.0% | 80 | 100 |
| 4 | LH | Sample C Corn Cob | 1,000 | 92.4 | 34.4 | 3,395 | 0 | 75.8% | 80 | 100 |
| 5 | HH | Sample C Corn Cob | 1,000 | 187.6 | 35.7 | 3,367 | 0 | 74.1% | 80 | 100 |
| 6 | MM-SA | Sample C Corn Cob | 1,000 | 160.7 | 30.1 | 3,149 | 268.5 | 68.3% | 80 | 100 |
| 7 | HH-CF | Sample B Corn Fiber | 1,000 | 171.2 | 32.1 | 3,002 | 0 | 71.4% | 80 | 45 |

*high (H), medium (M), and low (L) levels of NaOH (first letter) and $H_2O_2$ (second letter). The "SA" indicates that a polyacrylic acid sodium salt ($M_w$ ~3500 kDa) sequestering agent was used as an additive.

TABLE 8

Dry agglomerated granules used in flotation experiments

| ID | Relative Reagent Levels | Total Dissolvable | Fiber (Insoluble) | Fiber (Soluble)* | NaOH (Soluble) | SA | Moisture (soluble) | Fiber Ext. | Total Solids Ext. |
|---|---|---|---|---|---|---|---|---|---|
| 1 | LL | 27.0% | 73.0% | 17.64% | 8.01% | — | 1.325% | 19.45% | 26.0% |
| 2 | MM | 45.6% | 54.4% | 31.07% | 13.22% | — | 1.300% | 36.34% | 44.9% |
| 3 | HL | 53.3% | 46.7% | 35.58% | 15.32% | — | 2.408% | 43.25% | 52.2% |
| 4 | LH | 30.6% | 69.4% | 21.03% | 8.35% | — | 1.250% | 23.26% | 29.8% |

TABLE 8-continued

Dry agglomerated granules used in flotation experiments

| ID | Relative Reagent Levels | Total Dissolvable | Fiber (Insoluble) | Fiber (Soluble)* | NaOH (Soluble) | SA | Moisture (soluble) | Fiber Ext. | Total Solids Ext. |
|---|---|---|---|---|---|---|---|---|---|
| 5 | HH | 53.6% | 46.4% | 36.99% | 15.65% | — | 0.916% | 44.34% | 53.1% |
| 6 | MM-SA | 60.2% | 39.8% | 30.15% | 11.24% | 18.79% | 0.000% | 43.10% | 60.2% |
| 7 | HH-CF | 61.0% | 39.0% | 44.52% | 14.30% | — | 2.182% | 53.30% | 60.1% |

*Soluble fiber is the active ingredient on which depressant dosages are calculated.

Example 4: Flotation Experiments

The flotation tests were performed in a 1-liter Metso laboratory flotation cell with continuous agitation at 800 rpm. For the flotation tests, a 50% solid slurry was generated by mixing ore (308 g) and tap water (308 g) in the flotation cell. The pH was adjusted from about 7.3 to 10.5 and maintained at 10.5 with NaOH (25%) solution. After 1 min of mixing, the depressant was added as dry granules, or as a solution (8.27% active) for the aqueous alkaline hydrogen peroxide baseline. The slurry was allowed to condition with the depressant for 5 minutes while maintaining a pH of 10.5 with NaOH. Tap water was added in an amount to target 25% solids after addition of all reagents. The collector (1% solution, Tomamine DA-16) and frother (1.54 mL, 1% solution, 50 g MIBC/ton ore solids) were added and allowed to condition for 1 min while maintaining a pH of 10.5-10.6. Air flow was then initiated to begin flotation. The pH measured prior to flotation was about 10.5-10.6. Four froth (tail) fractions were collected from times: 0 to 30 s; 30 to 60 s; 60 to 90 s; and 90 to 180 s. Air flow was stopped after 180 s. The four tailing samples and concentrate sample were dried, weighed, collected, and analyzed for Fe and Si by X-ray fluorescence (XRF). Initial feed concentrations were calculated based on the sum of all tail and concentrate analyses.

A series of flotation experiments (A-Y) were performed with conditions and results presented in Table 9.

Flotation experiments A-D were blank flotation experiments where no depressant was added. These experiments were performed to determine the amount of diamine collector required to achieve targeted $SiO_2$ grade of 4% or lower. 300 and 350 g diamine collector per ton of ore was not sufficient, resulting in very little solid floating (mass recovery above 90% for both A and B). Flotation experiments C and D also did not achieve the desired target of 4% $SiO_2$ grade, but they were much closer. Since the addition of depressant was expected to further improve the final $SiO_2$ grade, 400 g of diamine collector per ton of ore was deemed to be an acceptable collector level for subsequent experiments with depressants.

With the collector fixed at 400 g per ton of ore, varying levels of aqueous alkaline hydrogen peroxide extracted hemicellulose depressant were assessed in flotation experiments (E-J). Depressant levels varied from 600 to 1500 g hemicellulose per ton of ore. Levels of 900-1500 g depressant per ton of ore (F-J) all had similar selectivity, which was better than the blank. At 600 g hemicellulose depressant per ton of ore (E), the selectivity was significantly reduced from that of F-J and only slightly better than the blank.

The percent depression data for iron and silica indicated that, at a low level (600 g/ton, E) of the aqueous alkaline hydrogen peroxide extracted hemicellulose depressant, neither iron nor silica are depressed, but rather, their percent

TABLE 9

Flotation conditions and results

| Exp. | ID, Type | Depressant (g/ton)* | Collector (g/ton) | Flotation pH Initial | Flotation pH Final | Recovery Mass | Recovery Fe | $SiO_2$ Grade | SI |
|---|---|---|---|---|---|---|---|---|---|
| A | Blank | — | 300 | 10.18 | 9.34 | 91.0% | 93.3% | 8.85% | 2.25 |
| B | Blank | — | 350 | 10.34 | 9.51 | 88.5% | 91.3% | 9.09% | 2.21 |
| C | Blank | — | 400 | 10.34 | 9.51 | 76.3% | 80.1% | 4.96% | 2.45 |
| D | Blank | — | 450 | 10.64 | 9.80 | 79.6% | 83.9% | 5.26% | 2.69 |
| E | Baseline | 600 | 400 | 10.71 | 9.93 | 69.2% | 74.1% | 3.79% | 2.83 |
| F | Baseline | 900 | 400 | 10.57 | 9.93 | 85.7% | 91.4% | 3.42% | 4.83 |
| G | Baseline | 1,200 | 400 | 10.60 | 9.71 | 85.2% | 90.9% | 3.16% | 4.84 |
| H | Baseline | 1,500 | 400 | 10.53 | 9.84 | 88.3% | 93.5% | 4.25% | 4.69 |
| I | Repeat | 900 | 400 | 10.61 | 9.97 | 89.1% | 93.9% | 5.20% | 4.19 |
| J | Repeat | 1,200 | 400 | 10.63 | 9.88 | 89.8% | 94.3% | 5.28% | 4.22 |
| K | 1, LL | 1,200 | 400 | 10.64 | 9.95 | 92.6% | 94.8% | 5.98% | 2.91 |
| L | 2, MM | 1,200 | 400 | 10.58 | 9.92 | 91.7% | 94.2% | 4.13% | 3.52 |
| M | 3, HL | 1,200 | 400 | 10.56 | 9.81 | 91.4% | 93.9% | 5.72% | 3.00 |
| N | 4, LH | 1,200 | 400 | 10.61 | 9.97 | 92.3% | 94.5% | 7.54% | 2.54 |
| O | 5, HH | 1,200 | 400 | 10.57 | 9.95 | 91.7% | 94.1% | 7.05% | 2.68 |
| P | 2, MM | 900 | 400 | 10.59 | 10.10 | 91.5% | 94.4% | 6.34% | 3.16 |
| Q | 2, MM | 600 | 400 | 10.62 | 9.90 | 90.5% | 94.1% | 5.56% | 3.57 |
| R | 2, MM | 450 | 400 | 10.64 | 9.84 | 89.3% | 92.6% | 7.57% | 2.73 |
| S | 2, MM | 600 | 450 | 10.56 | 10.03 | 83.8% | 89.0% | 3.80% | 3.92 |
| T | 2, MM | 600 | 500 | 10.57 | 10.03 | 78.9% | 83.5% | 6.24% | 2.56 |
| U | 6, MM-SA | 1,200 | 400 | 10.64 | 10.15 | 94.3% | 96.7% | 6.06% | 3.65 |
| V | 6, MM-SA | 600 | 400 | 10.62 | 9.99 | 92.7% | 95.5% | 8.18% | 3.03 |
| W | 6, MM-SA | 600 | 450 | 10.66 | 10.00 | 86.6% | 91.9% | 4.94% | 3.99 |
| X | 6, MM-SA | 600 | 500 | 10.60 | 9.97 | 78.2% | 84.0% | 3.35% | 3.81 |
| Y | 7, HH-CF | 600 | 450 | 10.60 | 9.85 | 85.5% | 91.0% | 4.29% | 4.18 | floated increased. At the higher depressant level of F (900 g/ton), iron depression is achieved, while the percent flotation of silica is increased.

The targeted $SiO_2$ grade of less than 4% was achieved for E, F, and G; however, E did not achieve good iron recovery due to poor selectivity.

Figure 8:
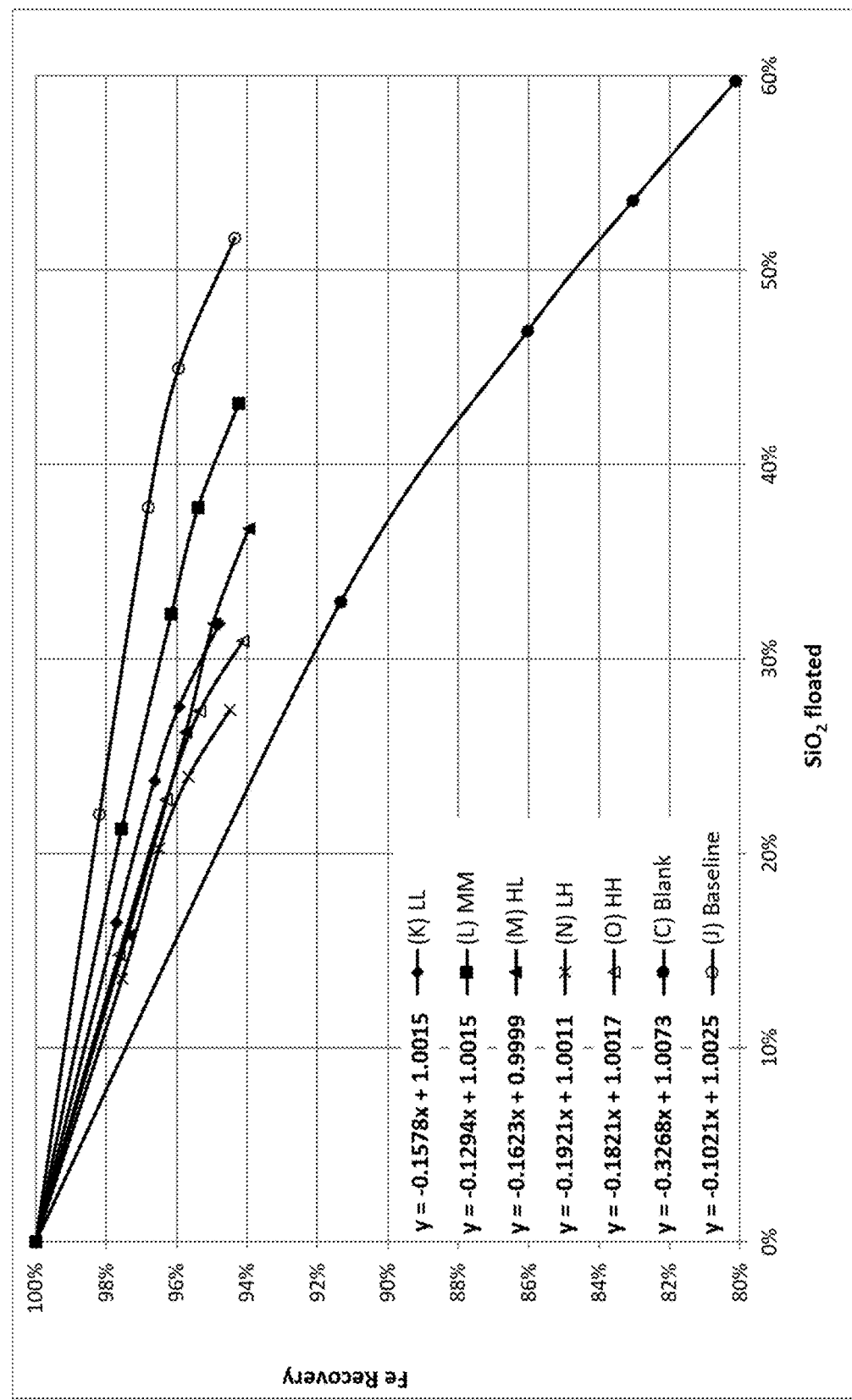
FIG. 8: shows a plot of percent Fe recovery vs. percent $SiO_2$ floated for C and J-O.
Figure 9:
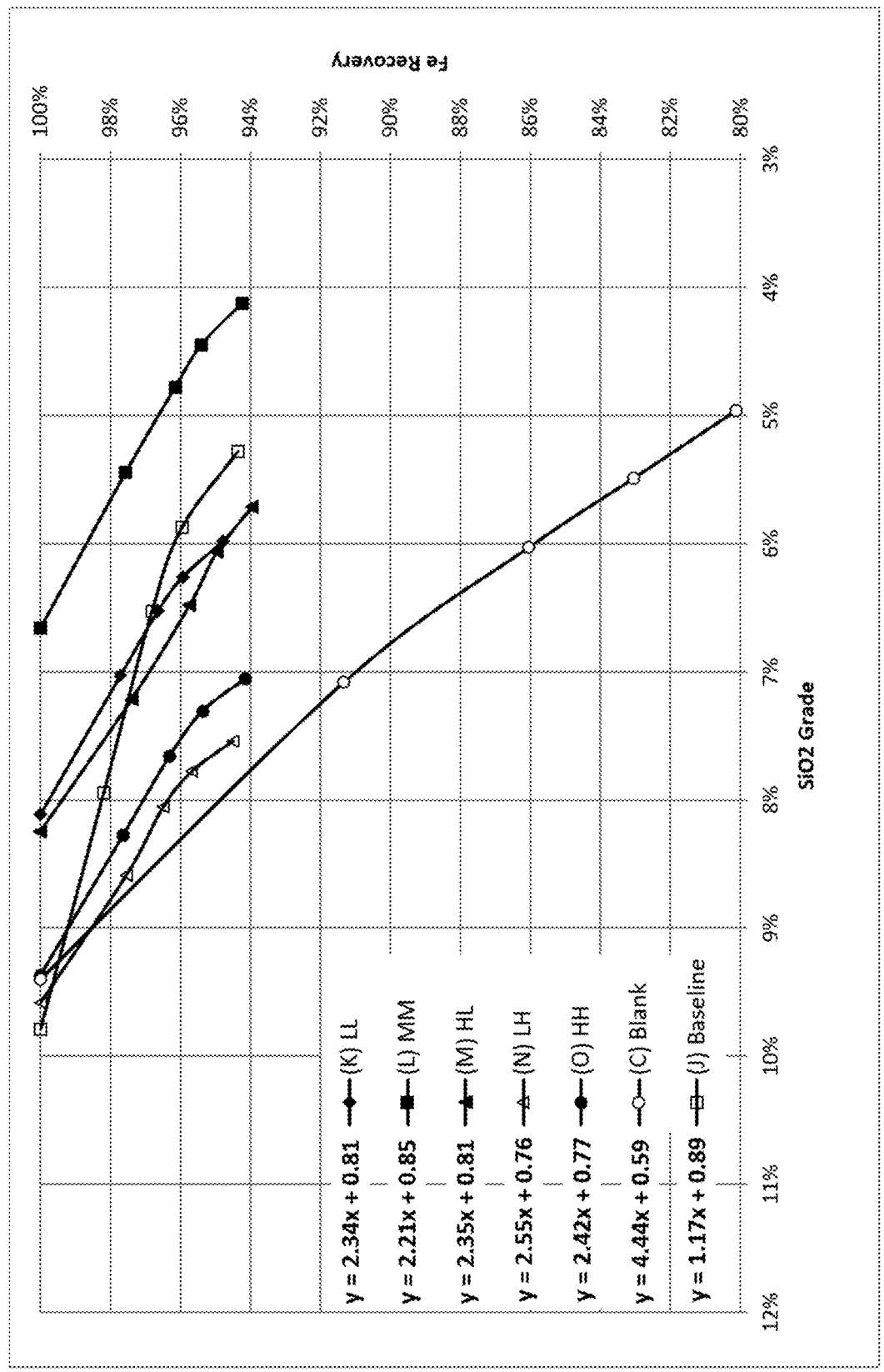
FIG. 9: shows a plot of percent Fe recovery vs. percent $SiO_2$ grade for C and J-O.
Figure 10:
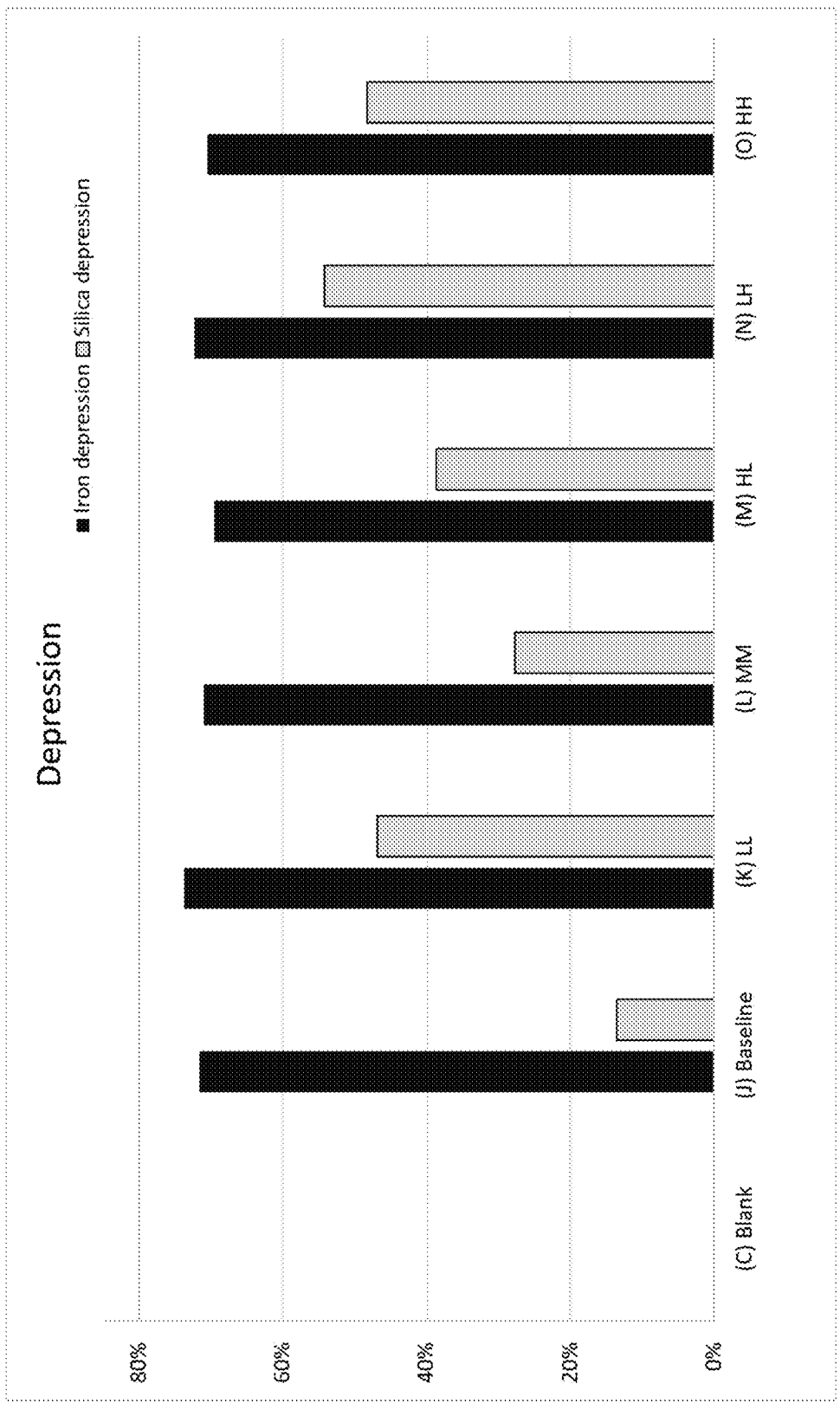
FIG. 10: shows percent Fe and $SiO_2$ depression for J-O.

Cob granule samples 1-5 were used in flotation experiments K-O. The results shown in FIGS. 8-10 indicate these experiments have high depression of both iron and silica, which resulted in a failure to meet the desired $SiO_2$ grade of less than 4%. The flotation experiment closest to this target was L, with sample 2, achieving a $SiO_2$ grade of 4.13%. The highest selectivity for K-O was L. All flotation experiments K-O had similar, high depression of iron. Silica was also depressed, but to a less extent for L. The highest selectivity of K-O, by FIG. 8, is with L.

Figure 11:
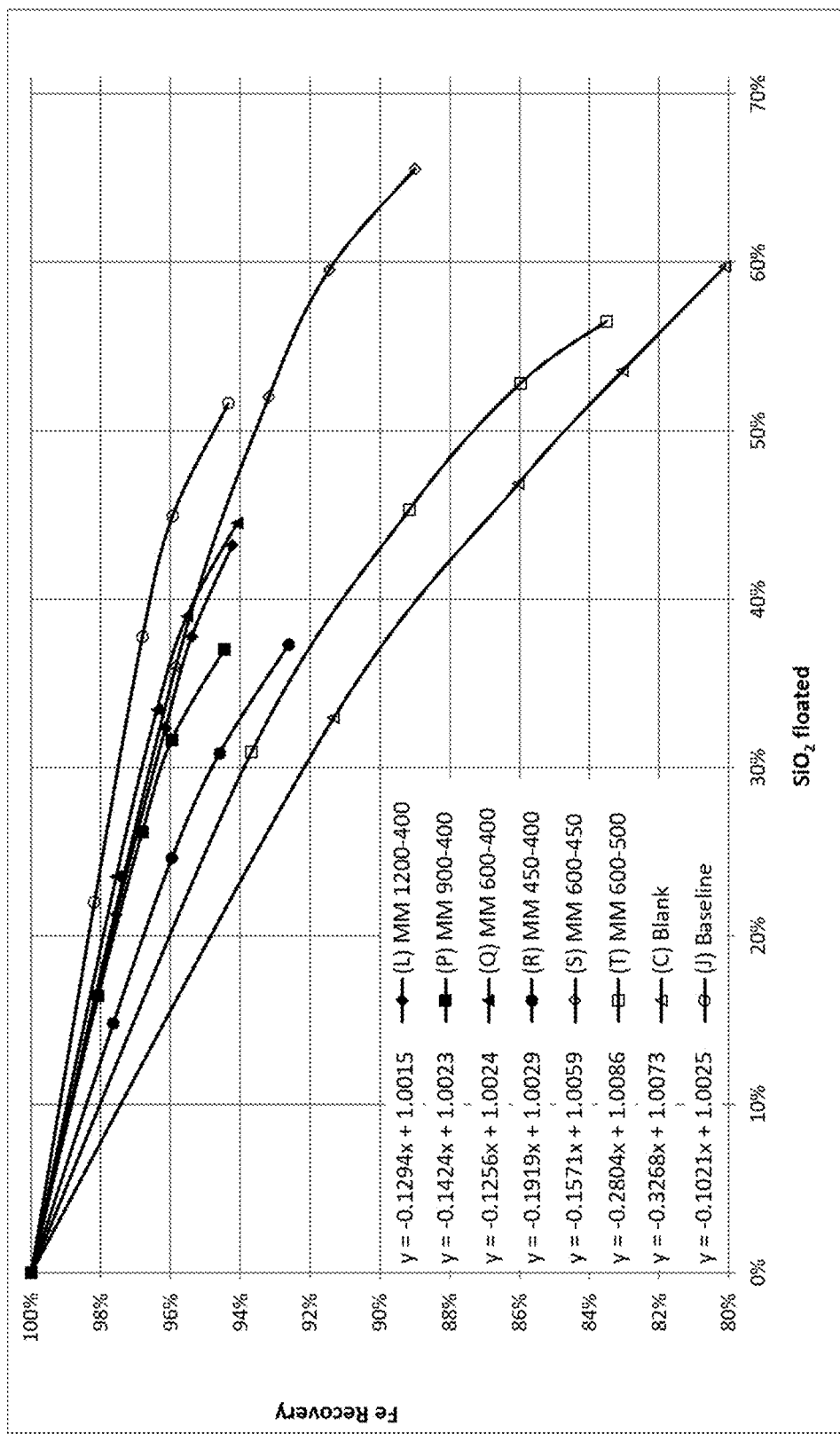
FIG. 11: shows percent Fe recovery vs. percent $SiO_2$ floated for C, J, L and P-T.
Figure 12:
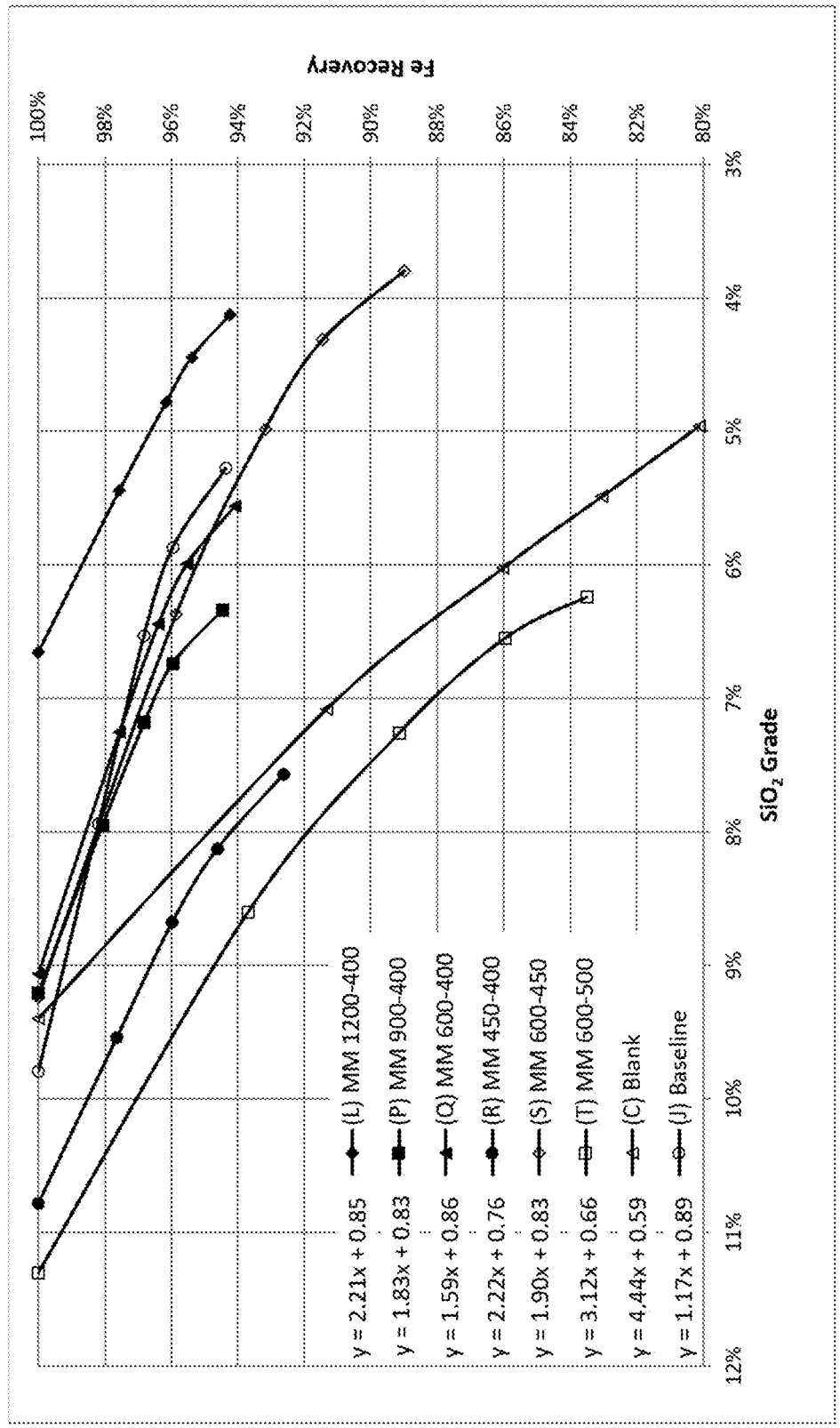
FIG. 12: shows percent Fe recovery vs. percent $SiO_2$ grade for C, J, L and P-T.
Figure 13:
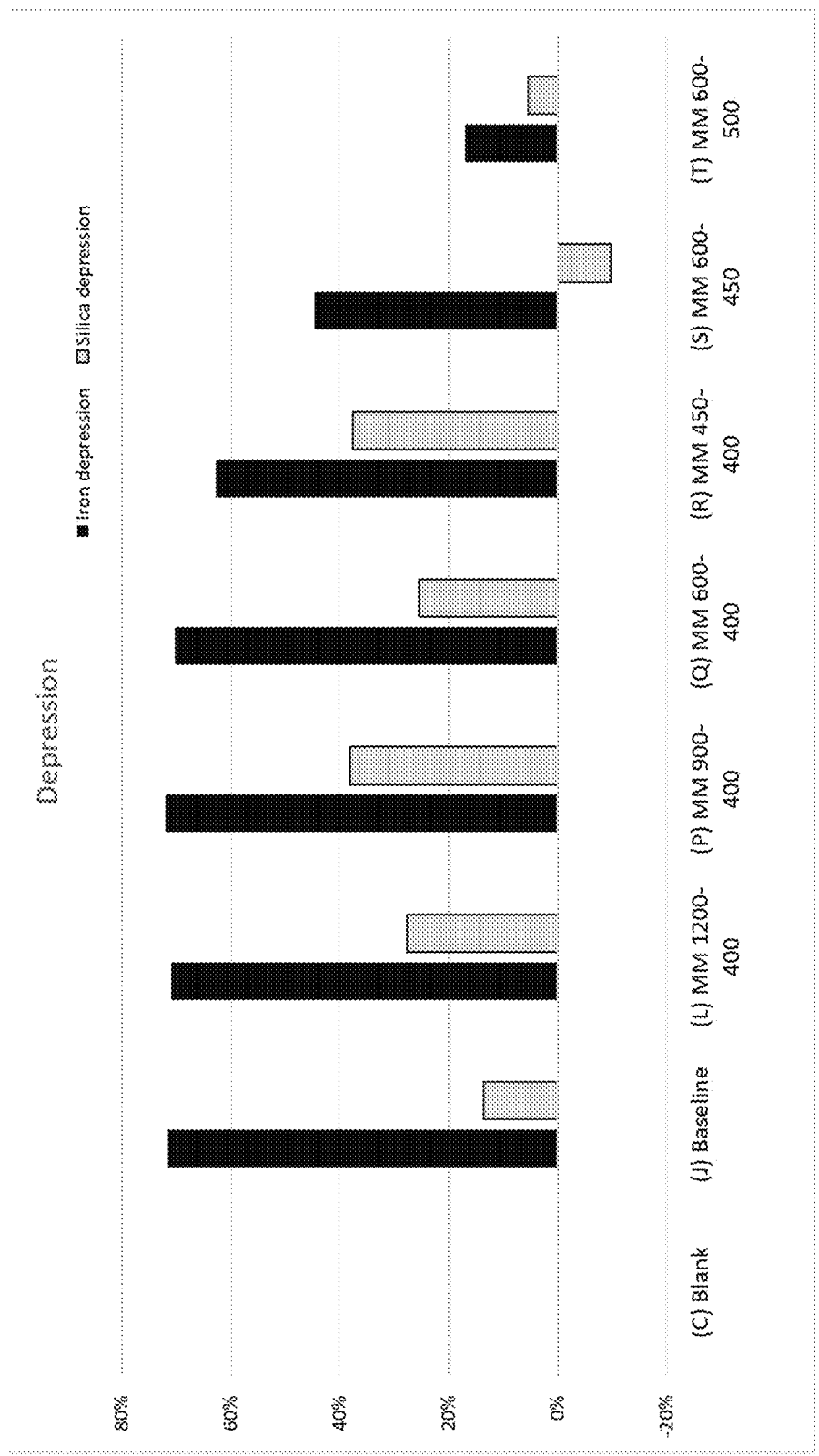
FIG. 13: shows percent Fe and SiO$_2$ depression for C, J, L and P-T.

Flotation experiments L, and P-T contain various levels of diamine collector and depressant 2 (FIGS. 11-13). The various levels of 2 with 400 g collector per ton of ore (L, and P-R) indicate that 600-1200 g depressant per ton of ore give effective selectivity, while the selectivity with 450 g depressant per ton of ore is reduced. Therefore, 600 g of depressant per ton of ore was selected as the adequate dosage for sample 2.

Since Q did not achieve the target $SiO_2$ grade, was the lowest effective dosage level tested, and resulted in high depression of both iron and silica, higher collector levels of 450 (S) and 500 g/ton (T) were tested. The selectivity was maintained when increasing the collector from 400 (Q) to 450 (S) g collector per ton of ore. Although iron depression was slightly reduced, silica depression was reduced much more (FIG. 13), which allowed S to achieve the target $SiO_2$ grade with 3.80% at 89% recovery of iron.

Further increasing the collector to 500 (T) g per ton of ore, resulted in a decrease in flotation performance through a decrease in selectivity from Q and S and an increase in mass floated.

Sample 6 was assessed in experiments U-X (data not shown). Collector at 400 g per ton of ore resulted in high depression of both iron and silica with depressant levels of 1200 (U) and 600 (V) g per ton of ore. With additional collector (450 g/ton) in W, selectivity was maintained with less silica depression; however, the $SiO_2$ grade was not met. Additional collector at 500 g/ton (X) did not reduce selectivity, but floated much more material. In fact, after 30 seconds, X performed nearly identically to the baseline (J) after the full 3 min of flotation. After 60 seconds, X had met the $SiO_2$ grade, at 3.92% with 90% recovery.

Sample 7 was floated at 600 g depressant and 450 g collector per ton (Y) (data not shown). The resulting selectivity for Y was consistent with the baseline (J), Cob granules (S) and Cob/SA granules (W). Y showed good depression of iron and increased flotation of $SiO_2$.

We claim:

1. A process for enriching a desired mineral from an ore comprising the desired mineral and gangue, wherein the process comprises carrying out a flotation process in the presence of one or more collecting agents and a depressant composition, wherein the depressant composition comprises an agglomerated hemicellulose composition having at least about 50% of the agglomerates are retained on a 20 mesh sieve, at least about 90% of the agglomerates are retained on a 100 mesh sieve, and the size of the agglomerates ranges from about 0.1 to about 15 mm.

2. The process of claim 1, wherein the desired mineral is an iron-containing mineral.

3. The process of claim 1, wherein the gangue comprises oxides of silica, silicates or siliceous materials.

4. The process of claim 1, wherein the flotation process is a reverse cationic flotation process.

5. A process for enriching iron from iron ore containing $SiO_2$, wherein the process comprises carrying out a flotation process in the presence of one or more collecting agents and a depressant composition, wherein the depressant composition comprises an agglomerated hemicellulose composition having at least about 50% of the agglomerates are retained on a 20 mesh sieve, at least about 90% of the agglomerates are retained on a 100 mesh sieve, and the size of the agglomerates ranges from about 0.1 to about 15 mm.

6. The process of claim 5, wherein the flotation process comprises:
   (a) preparing an ore-water slurry by combining ore with water in a flotation cell;
   (b) adding a depressant composition to the ore-water slurry;
   (c) adding water to the ore-water slurry to provide a mixture having a solids content from about 20% to about 40%;
   (d) adding at least one collecting agent to the mixture having a solids content from about 20% to about 40%; and
   (e) beginning air flow to the flotation cell.

* * * * *